US012405627B2

(12) United States Patent
Kim et al.

(10) Patent No.: US 12,405,627 B2

(45) Date of Patent: Sep. 2, 2025

(54) BANDGAP REFERENCE CIRCUIT USING HETEROGENEOUS POWER AND ELECTRONIC DEVICE HAVING THE SAME

(71) Applicant: Samsung Electronics Co., Ltd., Suwon-si (KR)

(72) Inventors: Kyung-Min Kim, Seoul (KR); Haesick Sul, Suwon-si (KR); Sunyool Kang, Suwon-si (KR); Yunhong Kim, Hwaseong-si (KR); Seungmin Suh, Seongnam-si (KR); Hyeonji Lee, Chuncheon-si (KR); Yunhwan Jung, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 51 days.

(21) Appl. No.: 18/322,355

(22) Filed: May 23, 2023

(65) Prior Publication Data

US 2023/0295908 A1 Sep. 21, 2023

Related U.S. Application Data

(63) Continuation of application No. 17/150,316, filed on Jan. 15, 2021, now Pat. No. 11,709,518.

(30) Foreign Application Priority Data

Jun. 4, 2020 (KR) ........................ 10-2020-0067576

(51) Int. Cl.

| | |
|---|---|
| ***G05F 3/26*** | (2006.01) |
| ***E03C 1/086*** | (2006.01) |
| ***G05F 1/46*** | (2006.01) |

(52) U.S. Cl.

CPC .............. *G05F 3/265* (2013.01); *E03C 1/086* (2013.01); *G05F 1/461* (2013.01); *G05F 1/468* (2013.01)

(58) Field of Classification Search

CPC ..... G05F 3/00; G05F 3/02; G05F 3/08; G05F 3/16; G05F 3/185; G05F 3/20;

(Continued)

(56) References Cited

U.S. PATENT DOCUMENTS

| | | |
|---|---|---|
| 5,796,244 A | 8/1998 | Chen et al. |
| 6,121,827 A | 9/2000 | Khoini-Poorfard et al. |

(Continued)

FOREIGN PATENT DOCUMENTS

| | | |
|---|---|---|
| JP | 2001337731 A | 12/2001 |
| KR | 101603707 B1 | 3/2016 |

OTHER PUBLICATIONS

Office Action dated May 13, 2022 for corresponding U.S. Appl. No. 17/150,316.

*Primary Examiner* — Thienvu V Tran
*Assistant Examiner* — Carlos O Rivera-Perez
(74) *Attorney, Agent, or Firm* — Harness, Dickey & Pierce, P.L.C.

(57) ABSTRACT

Disclosed is a bandgap reference circuit, which includes a first current generator that generates a first current proportional to a temperature, a second current generator that outputs a second current obtained by mirroring the first current to a first node at which a reference voltage is formed, a first resistor that is connected with the first node and is supplied with the second current, and a first bipolar junction transistor (BJT) that includes an emitter node connected with the first resistor, a base node supplied with a first power, and a collector node supplied with a second power different from the first power.

12 Claims, 18 Drawing Sheets

(58) Field of Classification Search

CPC . G05F 3/205; G05F 3/22; G05F 3/222; G05F 3/225; G05F 3/227; G05F 3/24; G05F 3/245; G05F 3/247; G05F 3/26; G05F 3/262; G05F 3/265; G05F 3/267; G05F 3/30; G05F 1/00; G05F 1/10; G05F 1/46; G05F 1/461; G05F 1/462; G05F 1/463; G05F 1/466; G05F 1/467; G05F 1/468; G05F 1/56; G05F 1/561; G05F 1/567; E03C 1/08; E03C 1/086

USPC ......... 323/281, 304, 311–317, 907; 327/530, 327/538–543

See application file for complete search history.

(56) References Cited

U.S. PATENT DOCUMENTS

| | | | | |
|---|---|---|---|---|
| 6,841,982 | B2 | 1/2005 | Tran | |
| 7,619,401 | B2 | 11/2009 | Chen et al. | |
| 7,880,534 | B2 | 2/2011 | Huang et al. | |
| 8,971,005 | B2 | 3/2015 | Tseng | |
| 9,213,353 | B2 | 12/2015 | Siao | |
| 9,252,132 | B2 | 2/2016 | Tago et al. | |
| 10,116,887 | B2 * | 10/2018 | Ikuma | H04N 25/65 |
| 2007/0182477 | A1 | 8/2007 | Kim | |
| 2016/0118978 | A1 | 4/2016 | Ahn | |
| 2019/0082126 | A1 * | 3/2019 | Hisamatsu | H04N 25/78 |
| 2019/0278316 | A1 | 9/2019 | Lee et al. | |

* cited by examiner

BANDGAP REFERENCE CIRCUIT USING HETEROGENEOUS POWER AND ELECTRONIC DEVICE HAVING THE SAME

CROSS-REFERENCE TO RELATED APPLICATIONS

This application is a continuation of U.S. patent application Ser. No. 17/150,316, filed on Jan. 15, 2021, which is a U.S. non-provisional patent application that claims priority under 35 U.S.C. § 119 to Korean Patent Application No. 10-2020-0067576 filed on Jun. 4, 2020, in the Korean Intellectual Property Office, the disclosures of which are incorporated by reference herein in their entireties.

BACKGROUND

Example embodiments of the present disclosure described herein relate to a bandgap reference circuit, and more particularly, relate to a bandgap reference circuit in which a transistor is driven based on heterogeneous power (two or more different types of power) and an electronic device including the same.

A semiconductor device may include various circuits for generating, processing, or storing data. The circuits of the semiconductor device may operate based on a reference voltage supplied from an external power source or any other circuit. For example, the reference voltage may vary depending on an external factor such as a temperature. The semiconductor device may include a bandgap reference circuit for the purpose of reducing or preventing an abnormal operation of the circuits of the semiconductor device and securing the reliability thereof. The bandgap reference circuit is a circuit that generates a reference voltage insensitive to a process-voltage-temperature (PVT) (or PVT variations).

In the case where a circuit shares the same substrate with the bandgap reference circuit within one semiconductor chip, the bandgap reference circuit may be influenced by a noise coming from the circuit. In particularly, as a semiconductor chip is highly integrated and is miniaturized, the influence of the noise on the bandgap reference circuit may increase. As such, there is required a method capable of improving the reliability of the bandgap reference circuit.

SUMMARY

Example embodiments of the present disclosure provide a bandgap reference circuit that is insensitive to a PVT, reduces a noise, and improves a reliability of a reference voltage, by applying heterogeneous power (for example, analog and digital power) to a transistor of the bandgap reference circuit, and an electronic device including the same.

According to example embodiments, a bandgap reference circuit includes a first current generator that generates a first current proportional to a temperature, a second current generator that outputs a second current obtained by mirroring the first current to a first node at which a reference voltage is formed, a first resistor that is connected with the first node and is supplied with the second current, and a first bipolar junction transistor (BJT) that includes an emitter node connected with the first resistor, a base node supplied with a first power, and a collector node supplied with a second power different from the first power.

According to example embodiments, an electronic device includes a bipolar junction transistor (BJT) that is at a semiconductor substrate, and a digital circuit that is at the semiconductor substrate and operates in a digital domain. The BJT includes a collector node that is connected with the semiconductor substrate and shares a first power with a digital node of the digital circuit, a base node that is connected with a first conductive region formed by implanting a first impurity into the semiconductor substrate and is supplied with a second power different from the first power, and an emitter node that is connected with a second conductive region formed by implanting a second impurity into the first conductive region and is connected with a resistor supplied with a current proportional to a temperature from a mirrored current generator.

According to example embodiments, an electronic device includes a first circuit that operates based on a first power, a second circuit that operates based on a second power different from the first power, and a bandgap reference circuit that generates a reference voltage used for operations of the first and second circuits, based on the first and second powers. The bandgap reference circuit includes a first current generator that generates a first current proportional to a temperature, a second current generator that outputs a second current obtained by mirroring the first current to a first node at which the reference voltage is formed, a first resistor that is connected with the first node and is supplied with the second current, and a bipolar junction transistor (BJT) that includes an emitter node connected with the first resistor, a base node supplied with the first power, and a collector node supplied with the second power.

BRIEF DESCRIPTION OF THE FIGURES

The above and other objects and features of the present disclosure will become apparent by describing in detail example embodiments thereof with reference to the accompanying drawings.

DETAILED DESCRIPTION

Figure 1:
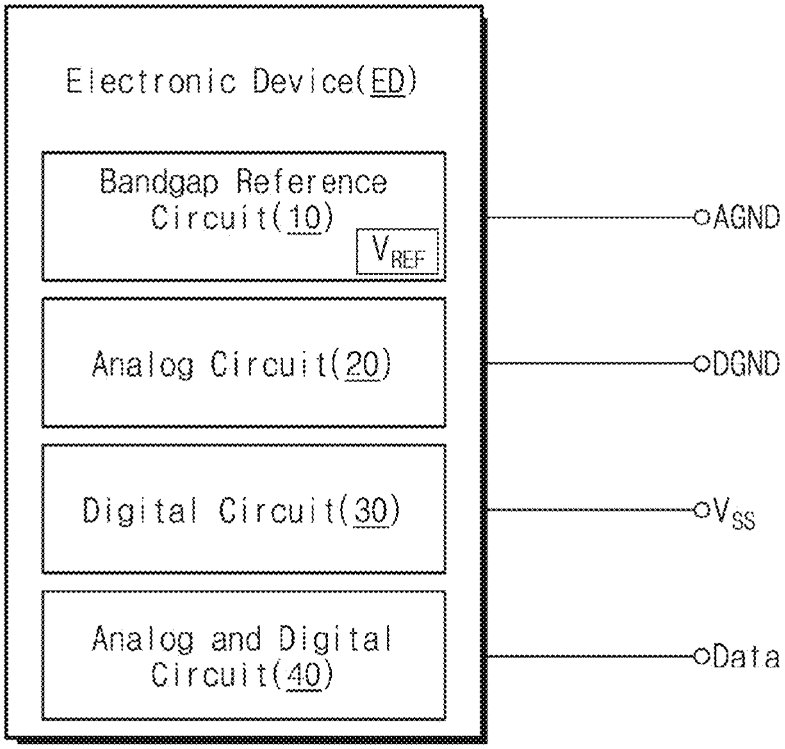
FIG. 1 is a block diagram illustrating an electronic device according to example embodiments of the present disclosure.

Below, example embodiments of the present disclosure may be described in detail and clearly to such an extent that an ordinary one in the art easily implements the present disclosure. Below, for convenience of description, similar components are expressed by using the same or similar reference numerals.

In the following drawings or in the detailed description, modules may be illustrated in a drawing or may be connected with any other components other than components in the detailed description. Modules or components may be connected directly or indirectly. Modules or components may be connected through communication or may be physically connected.

FIG. 1 is a block diagram illustrating an electronic device ED according to example embodiments of the present disclosure. Referring to FIG. 1, the electronic device ED that generates a data signal based on a power supplied from an external module (not illustrated) is illustrated. For example, the electronic device ED may be an electronic device included in a device such as a computer, a laptop, a smartphone, a digital camera, or a tablet.

The electronic device ED may include a bandgap reference circuit 10, an analog circuit 20, a digital circuit 30, and/or an analog and digital circuit 40. The electronic device ED may be supplied with an analog ground AGND, a digital ground DGND, and a power supply voltage $V_{SS}$ from the external module. The electronic device ED may output a data signal based on operations of the internal circuits 10, 20, 30, and/or 40. For example, the data signal may include at least one of a variety of information such as an image, a video, a sound, a text, a location, and a distance.

For example, the analog ground AGND may be a signal that is used for signal processing in an analog domain. For example, the analog ground AGND may be a ground voltage in the analog domain. The digital ground DGND may be a signal that is used for signal processing in a digital domain. For example, the digital ground DGND may be a ground voltage in the digital domain.

In example embodiments, a noise of the digital ground DGND may be different from a noise of the analog ground AGND. For example, the digital ground DGND may be connected with circuits of the digital domain; as a noise coming from operations of the circuits of the digital domain is introduced to the digital ground DGND, a noise of the digital ground DGND may be generated to be more frequent or greater than the noise of the analog ground AGND. For example, the noise of the digital ground DGND may be a noise of a DC component or a noise of an AC component.

The bandgap reference circuit 10 may be a circuit that generates a reference voltage $V_{REF}$. The reference voltage $V_{REF}$ may be a bandgap reference voltage. The reference voltage $V_{REF}$ may be a voltage that is used for an operation of at least one of the analog circuit 20, the digital circuit 30, and the analog and digital circuit 40. For example, in the case where the analog circuit 20 is a comparator determining whether an input value exceeds a reference value, the reference voltage $V_{REF}$ may be the reference value that is provided to the comparator.

In the case where the reference voltage $V_{REF}$ is different from a value intended at the time of design, the electronic device ED may operate abnormally or may output an incorrect data signal. To secure the reliability of the data signal output from the electronic device ED, the bandgap reference circuit 10 requires a characteristic strong on an external factor (e.g., a temperature variation, a noise, or a leakage current). That is, the bandgap reference circuit 10 may be required to generate the reference voltage $V_{REF}$ insensitive to process-voltage-temperature (PVT) (or PVT variations). This will be more fully described with reference to FIG. 3.

The analog circuit 20 may be a circuit that operates in the analog domain. For example, the analog circuit 20 may operate based on the power supply voltage $V_{SS}$ and the analog ground AGND. The digital circuit 30 may be a circuit that operates in the digital domain. For example, the digital circuit 30 may operate based on the power supply voltage $V_{SS}$ and the digital ground DGND. The analog and digital circuit 40 may be a circuit that operates in the analog domain and the digital domain. For example, the analog and digital circuit 40 may operate based on the power supply voltage $V_{SS}$, the analog ground AGND, and the digital ground DGND. For example, the analog and digital circuit 40 may be a circuit such as an analog-to-digital converter (ADC) circuit and a digital-to-analog converter (DAC) circuit.

In example embodiments, the electronic device ED may output a data signal based on an operation of at least one of the analog circuit 20, the digital circuit 30, and the analog and digital circuit 40. For example, the data signal may be output based on the reference voltage $V_{REF}$. The bandgap reference circuit 10 that generates the reference voltage $V_{REF}$ insensitive to the PVT is required to secure the reliability of the data signal output from the electronic device ED.

Figure 2:
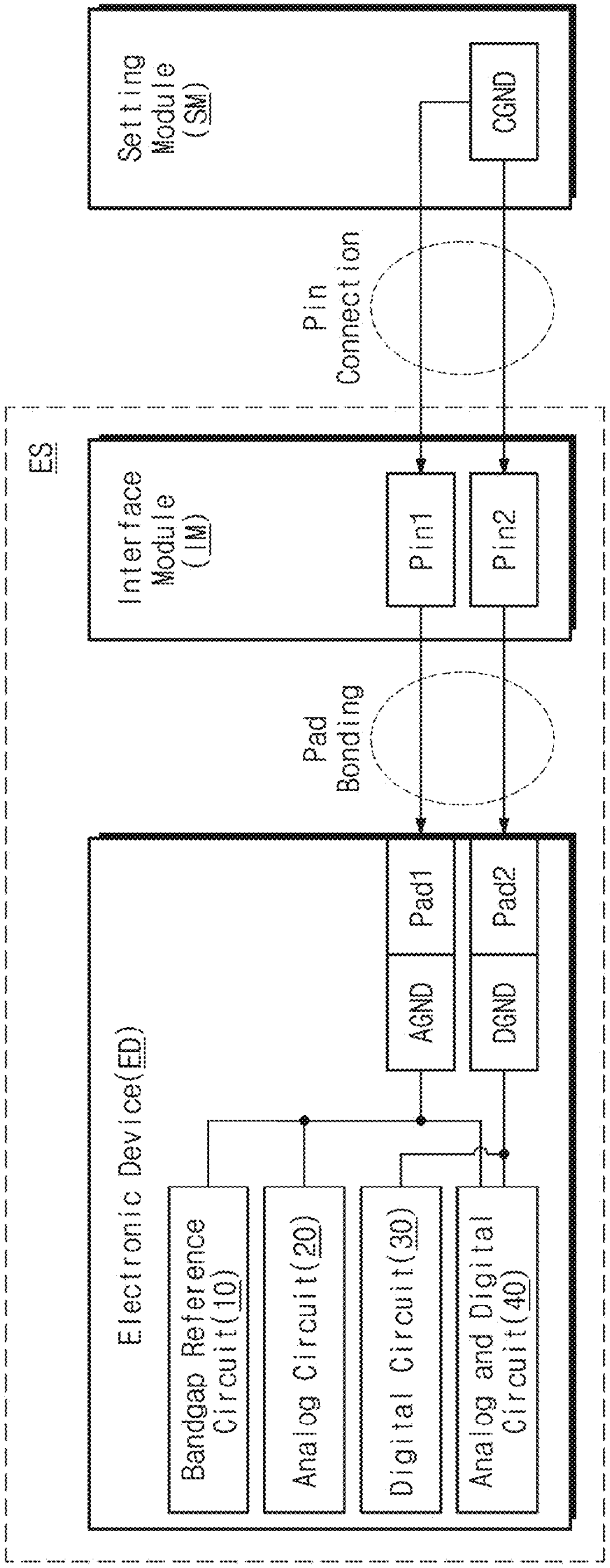
FIG. 2 is a block diagram illustrating an electronic system including an electronic device of FIG. 1 in detail.

FIG. 2 is a block diagram illustrating an electronic system ES including the electronic device ED of FIG. 1 in detail. Referring to FIG. 2, the electronic system ES may be connected with a setting module SM through a pin connection. The electronic system ES may be a system that performs a specific operation. For example, the electronic system ES may be a device such as a computer, a laptop, a smartphone, a digital camera, or a tablet.

The electronic system ES may include the electronic device ED and an interface module IM. The electronic device ED may include the bandgap reference circuit 10, the analog circuit 20, the digital circuit 30, the analog and digital circuit 40, a first pad (Pad1), and/or a second pad (Pad2). The bandgap reference circuit 10, the analog circuit 20, the digital circuit 30, and the analog and digital circuit 40 are described with reference to FIG. 1, and thus, additional description will be omitted to avoid redundancy.

The electronic device ED may be connected with the interface module IM through the first pad and the second pad. The electronic device ED may receive a first power through the first pad and may receive a second power through the second pad.

In example embodiments, the first power received through the first pad may be applied to the bandgap reference circuit 10, the analog circuit 20, and the analog and digital circuit 40. For example, the first power may be the analog ground AGND.

In example embodiments, the second power received through the second pad may be applied to the digital circuit 30 and the analog and digital circuit 40. For example, the second power may be the digital ground DGND.

The interface module IM may include a first pin and a second pin. The first pin may be connected with the first pad of the electronic device ED through a first pad bonding. The second pin may be connected with the second pad of the electronic device ED through a second pad bonding. That is, in the electronic system ES, the analog ground AGND and the digital ground DGND may be transmitted through separate paths.

However, the interface module IM according to example embodiments of the present disclosure is not limited thereto. For example, the interface module IM may further include a pin (e.g., a third pin) for transmitting a signal such as the power supply voltage $V_{SS}$ of FIG. 1. That is, the interface module IM may be a module that receives a signal, such as a power or data, from the outside of the electronic system ES or outputs a signal, such as a power or data, to the outside of the electronic system ES.

The setting module SM may be a module that provides a common ground CGND to the electronic system ES. The common ground CGND may be a power that is used in the electronic system ES. For example, the common ground CGND may be a voltage that is used as a reference for generating the grounds AGND and DGND within the electronic system ES.

In example embodiments, the first pin of the interface module IM may be connected with the common ground CGND of the setting module SM through a first pin connection. The second pin of the interface module IM may be connected with the common ground CGND of the setting module SM through a second pin connection. That is, the electronic system ES may receive a power corresponding to the analog ground AGND and a power corresponding to the digital ground DGND through different paths.

Figure 3:
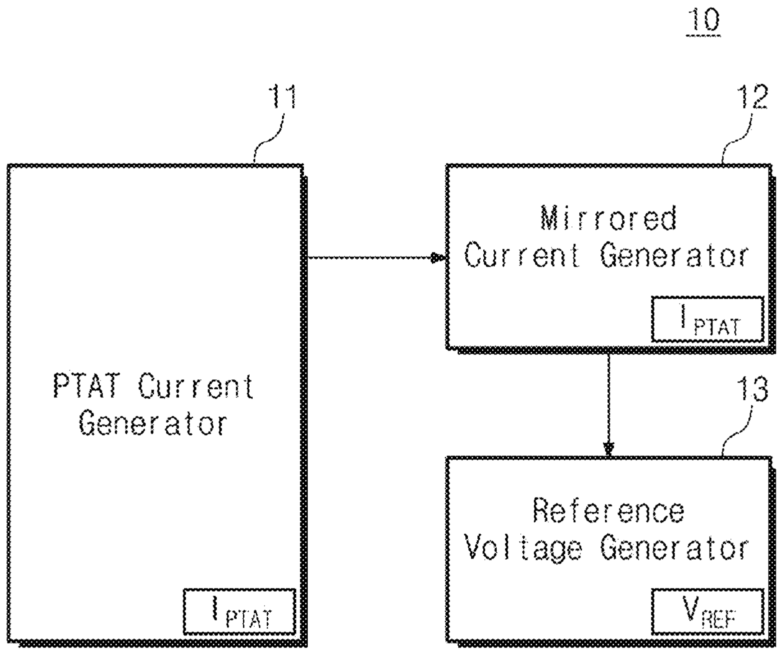
FIG. 3 is a block diagram illustrating a bandgap reference circuit of FIG. 1 in detail.

FIG. 3 is a block diagram illustrating the bandgap reference circuit 10 of FIG. 1 in detail. Referring to FIG. 3, the bandgap reference circuit 10 may include a proportional to absolute temperature (PTAT) current generator 11, a mirrored current generator 12, and/or a reference voltage generator 13.

The PTAT current generator 11 may generate a PTAT current $I_{PTAT}$. The PTAT current $I_{PTAT}$ may be a current, the magnitude of which increases in proportion to an absolute temperature. The mirrored current generator 12 may be electrically connected with the PTAT current generator 11. The mirrored current generator 12 may mirror the PTAT current $I_{PTAT}$ of the PTAT current generator 11. That is, the mirrored current generator 12 may generate the mirrored PTAT current $I_{PTAT}$.

The reference voltage generator 13 may receive the mirrored PTAT current $I_{PTAT}$ from the mirrored current generator 12. The reference voltage generator 13 may include a semiconductor device having a voltage inversely proportional to an absolute temperature. The reference voltage generator 13 may generate the reference voltage $V_{REF}$ insensitive to an absolute temperature based on the mirrored PTAT current $I_{PTAT}$ and a characteristic of the semiconductor device.

For example, in the case where an absolute temperature increases, a magnitude of the mirrored PTAT current $I_{PTAT}$ may increase, while the voltage of the semiconductor device may decrease. Accordingly, the influence due to the increase in the absolute temperature may be canceled out. In contrast, in the case where the absolute temperature decreases, the voltage of the semiconductor device may increase, while the magnitude of the mirrored PTAT current $I_{PTAT}$ may decrease. Accordingly, the influence due to the decrease in the absolute temperature may be canceled out. This will be more fully described with reference to FIG. 4.

Figure 4:
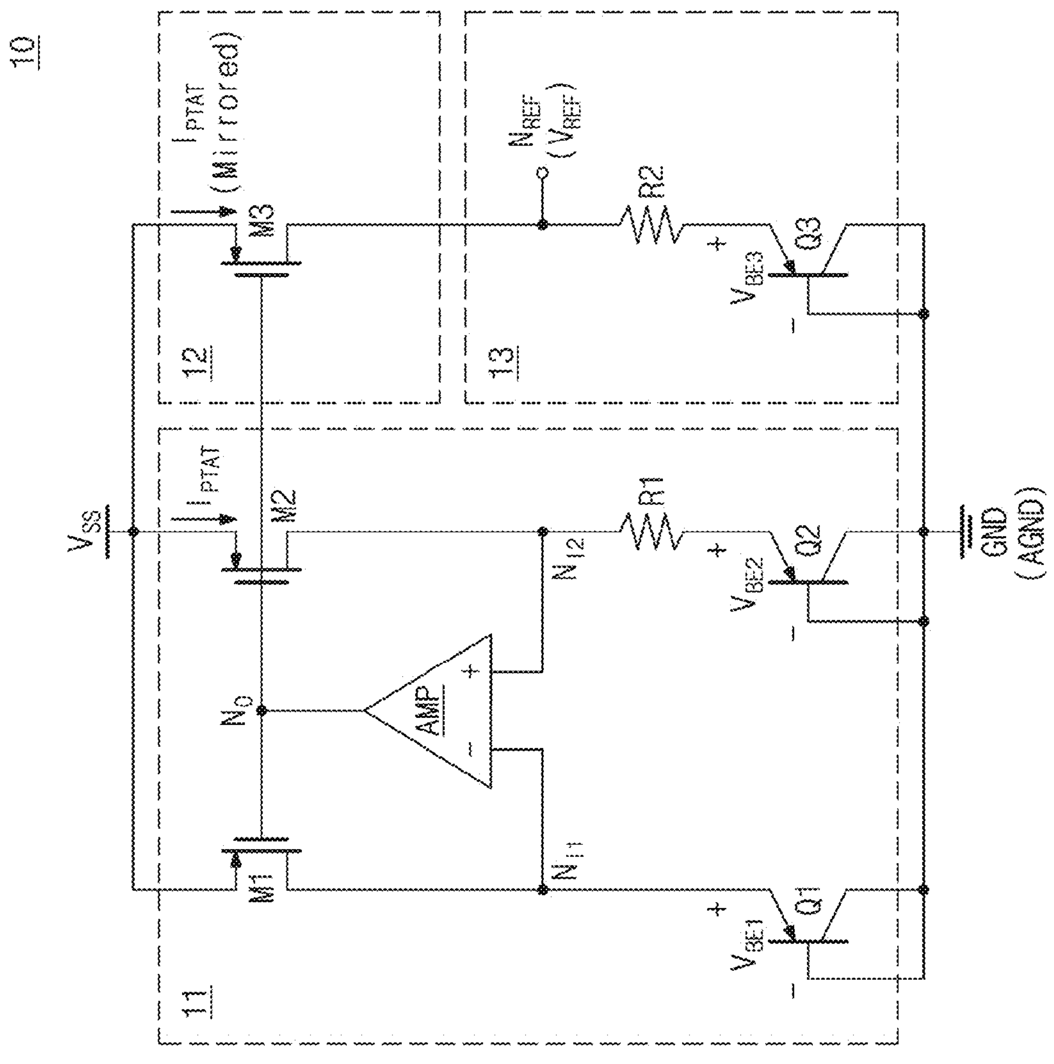
FIG. 4 is a circuit diagram illustrating a bandgap reference circuit of FIG. 3 in detail.

FIG. 4 is a circuit diagram illustrating the bandgap reference circuit 10 of FIG. 3 in detail. Referring to FIG. 4, the bandgap reference circuit 10 may include the PTAT current generator 11, the mirrored current generator 12, and the reference voltage generator 13.

The PTAT current generator 11 may include a first resistor R1, transistors Q1, Q2, M1, and M2, and/or an amplifier AMP. The PTAT current generator 11 may be supplied with the power supply voltage $V_{SS}$ and a ground GND. In example embodiments, each of the transistors Q1 and Q2 may be a bipolar junction transistor (BJT). For example, the transistors Q1 and Q2 may be PNP-type BJTs, but the present disclosure are not limited thereto. For example, the transistors Q1 and Q2 may be NPN-type BJTs.

The transistor Q1 may be connected between a first input node $N_{11}$ and the ground GND and may operate in response to the ground GND. For example, the transistor Q1 may include an emitter node connected with the first input node $N_{11}$ and a base node and a collector node connected with the ground GND.

The transistor Q2 may be connected between the first resistor R1 and the ground GND and may operate in response to the ground GND. For example, the transistor Q2 may include an emitter node connected with the first resistor R1 and a base node and a collector node connected with the ground GND.

The first resistor R1 may be connected between a second input node $N_{12}$ and the transistor Q2. The amplifier AMP may amplify a difference between a voltage of the first input node $N_{11}$ and a voltage of the second input node $N_{12}$ and may output the amplified difference through an output node $N_O$. The transistor M1 may be connected between a power node having the power supply voltage $V_{SS}$ and the first input node $N_{11}$ and may operate in response to a voltage of the output node $N_O$. The transistor M2 may be connected between the power node having the power supply voltage $V_{SS}$ and the second input node $N_{12}$ and may operate in response to the voltage of the output node $N_O$. For example, the transistor M2 may generate the PTAT current $I_{PTAT}$ in response to the voltage of the output node $N_O$. The transistor M2 may output the PTAT current $I_{PTAT}$ to the second input node $N_{12}$.

The mirrored current generator 12 may include a transistor M3. The mirrored current generator 12 may be supplied with the power supply voltage $V_{SS}$ and the voltage of the output node $N_O$. The transistor M3 may generate the mirrored PTAT current $I_{PTAT}$ in response to the voltage of the output node $N_O$. The transistor M3 may output the mirrored PTAT current $I_{PTAT}$ to a reference node $N_{REF}$. The reference node $N_{REF}$ may be a node where the reference voltage $V_{REF}$ is formed.

The reference voltage generator 13 may include a second resistor R2 and a transistor Q3. The reference voltage generator 13 may be supplied with the mirrored PTAT current $I_{PTAT}$ through the reference node $N_{REF}$. The reference voltage generator 13 may be supplied with the ground GND. In example embodiments, the transistor Q3 may be a BJT. For example, the transistor Q3 may be a PNP-type BJT.

The second resistor R2 may be connected with the reference node $N_{REF}$. The second resistor R2 may be supplied with the mirrored PTAT current $I_{PTAT}$ from the mirrored current generator 12. The transistor Q3 may be connected between the second resistor R2 and the ground GND and may operate in response to the ground GND. For example, the transistor Q3 may include an emitter node connected with the second resistor R2 and a base node and a collector node connected with the ground GND.

The reference voltage generator 13 may generate the reference voltage $V_{REF}$ insensitive to an absolute temperature based on the mirrored PTAT current $I_{PTAT}$ and a voltage $V_{BE3}$ of the transistor Q3. A characteristic in which the reference voltage $V_{REF}$ is insensitive to an absolute temperature will be more fully described with reference to Equation 1 below.

$$V_{REF}=I_{PTAT}R2+V_{BE3} \quad \text{[Equation 1]}$$

Equation 1 above is an equation indicating the reference voltage $V_{REF}$. $I_{PTAT}$ is the mirrored PTAT current $I_{PTAT}$ output from the mirrored current generator 12. R2 is a resistance value of the second resistor R2. $V_{BE3}$ is a voltage value between the emitter node and the base node of the transistor Q3. $V_{BE3}$ may have a value that is inversely proportional to an absolute temperature based on a device characteristic.

Because the mirrored PTAT current $I_{PTAT}$ is based on the PTAT current $I_{PTAT}$ generated by the PTAT current generator 11, assuming that "A" is a gain of the transistor Q1 and n*A is a gain of the transistor Q2, the PTAT current $I_{PTAT}$ may be expressed by Equation 2 below.

$$I_{PTAT}=\frac{V_{BE1}-V_{BE2}}{R1}=\frac{V_T\ln(n)}{R1} \quad \text{[Equation 2]}$$

Equation 2 above is an equation indicating the PTAT current $I_{PTAT}$. $V_{BE1}$ is a voltage value between the emitter node and the base node of the transistor Q1. $V_{BE2}$ is a voltage value between the emitter node and the base node of the transistor Q2. R1 is a resistance value of the first resistor R1. "n" is a ratio of a gain of the transistor Q2 to a gain of the transistor Q1. $V_T$ is a thermal voltage. Because a thermal voltage is proportional to an absolute temperature, the PTAT current $I_{PTAT}$ may have a magnitude proportional to the absolute temperature.

Returning to Equation 1 above, because $I_{PTAT}$ has a value proportional to an absolute temperature and $V_{BE3}$ has a value decreasing as the absolute temperature increases, the fluctuations of the absolute temperature may be canceled out. For example, in the case where an absolute temperature increases, because $I_{PTAT}$ increases and $V_{BE3}$ decreases, the influence of the increase in the absolute temperature on the reference voltage $V_{REF}$ may be canceled out. In contrast, in the case where the absolute temperature decreases, because $I_{PTAT}$ decreases and $V_{BE3}$ increases, the influence of the increase in the absolute temperature on the reference voltage $V_{REF}$ may be canceled out. That is, the reference voltage $V_{REF}$ may have a value insensitive to a change of an absolute temperature.

Figure 5:
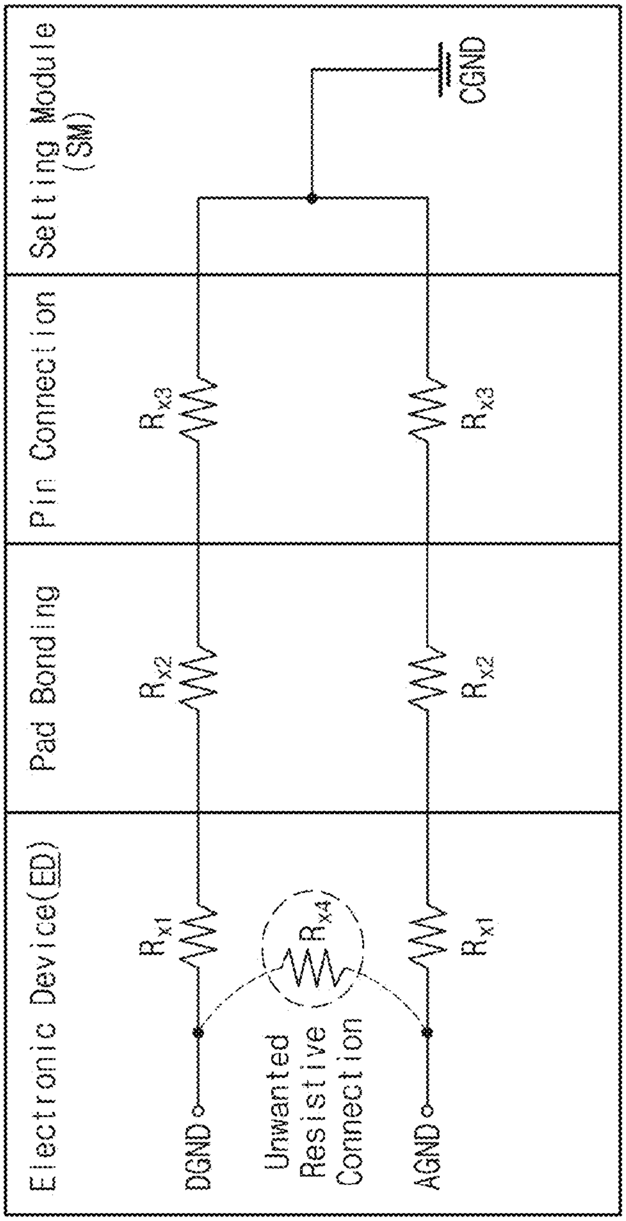
FIG. 5 is a diagram for describing an electronic device to which heterogeneous power is applied from a setting module.

FIG. 5 is a diagram for describing the electronic device ED to which heterogeneous power is applied from the setting module SM. Referring to FIG. 5, the electronic device ED to which heterogeneous power is applied through pad bondings and pin connections, and the setting module SM are illustrated. The setting module SM may have the common ground CGND. The setting module SM may provide the grounds AGND and DGND to the electronic device ED through separated pin connections and separated pad bondings.

The analog ground AGND of the electronic device ED may be connected with the common ground CGND through a first path including a series of resistors $R_{X1}$, $R_{X2}$, and $R_{X3}$. The digital ground DGND of the electronic device ED may be connected with the common ground CGND through a second path including a series of resistors $R_{X1}$, $R_{X2}$, and $R_{X3}$. Herein, the resistor $R_{X1}$ may be an internal resistor of the electronic device ED. The resistor $R_{X2}$ may be a resistor corresponding to a pad bonding. The resistor $R_{X3}$ may be a resistor corresponding to a pin connection.

In example embodiments, the electronic device ED may be a semiconductor chip including a plurality of circuits formed at one semiconductor substrate. Terminals of the grounds AGND and DGND of the electronic device ED may be intended as separated terminals at the time of design. However, as the electronic device ED is manufactured at one semiconductor substrate, an unwanted resistive connection may be occurred between a terminal of the analog ground AGND and a terminal of the digital ground DGND.

In example embodiments, the digital ground DGND may be a power at which a noise occurs greatly compared to the analog ground AGND. The noise of the digital ground DGND may be transferred to the analog ground AGND through the unwanted resistive connection. The influence of the noise of the digital ground DGND on the analog ground AGND may be expressed by Equation 3 below.

$$AGND_n=DGND_n\times\frac{R_{X1}+R_{X2}+R_{X3}}{R_{X1}+R_{X2}+R_{X3}+R_{X4}} \quad \text{[Equation 3]}$$

Equation 3 above is an equation indicating the influence $AGND_n$ of a noise of the digital ground DGND on the analog ground AGND. $DGND_N$ is a noise of the digital ground DGND randomly assumed. Herein, $R_{X1}$ is an internal resistance value of the electronic device ED. $R_{X2}$ is a resistance value corresponding to a pad bonding. $R_{X3}$ is a resistance value corresponding to a pin connection. $R_{X4}$ is a value corresponding to a resistive connection occurring between the terminal of the analog ground AGND and the terminal of the digital ground DGND.

For example, when $DGND_n$ is 100 mV, each of $R_{X1}$, $R_{X2}$, and $R_{X3}$ is 100 mΩ, and $R_{X4}$ is 10Ω, $AGND_N$ calculated by using Equation 3 above may be 2.9 mV.

As described above, an unwanted resistive connection may be occurred between the terminal of the analog ground AGND and the terminal of the digital ground DGND within the electronic device ED. A circuit (e.g., the bandgap reference circuit 10 of FIG. 4) that operates based on the analog ground AGND may abnormally operate due to the resistive connection (e.g., may generate the reference voltage $V_{REF}$ being out of a value intended at the time of design). As such, a way to reduce the influence of a noise of the digital ground DGND on the analog ground AGND may be required.

Figure 6:
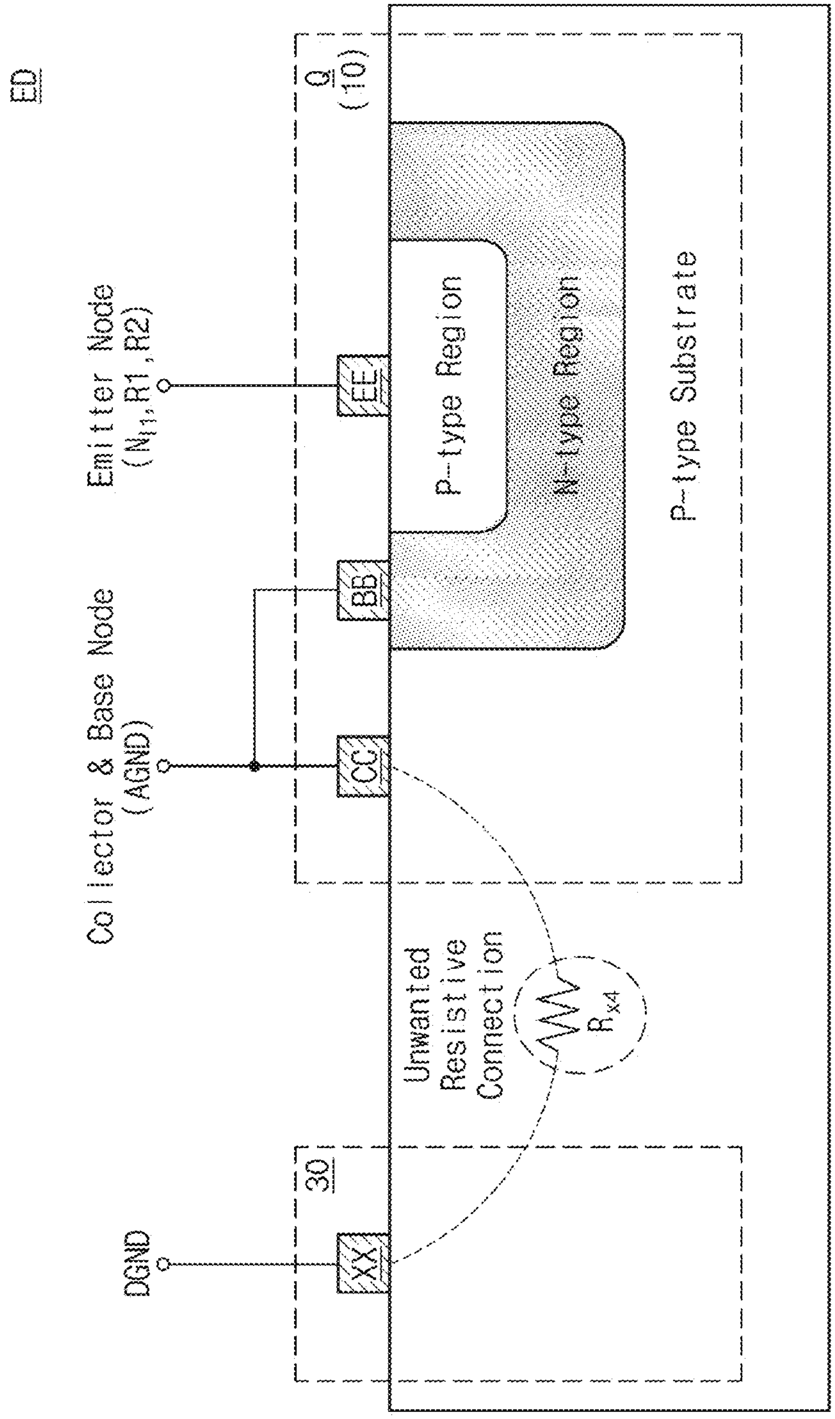
FIG. 6 is a diagram illustrating an electronic device of FIG. 5 in detail.

FIG. 6 is a diagram illustrating the electronic device ED of FIG. 5 in detail. Referring to FIG. 6, a manufacturing process drawing corresponding to a part of the electronic device ED formed on a semiconductor substrate is illustrated. The electronic device ED may include a transistor "Q" and the digital circuit 30. The transistor "Q" may include a collector node CC, a base node BB, and an emitter node EE. The digital circuit 30 may include a digital node XX. The transistor "Q" may be a part of the bandgap reference circuit 10 included in the electronic device ED. For example, the transistor "Q" may be one of the transistors Q1, Q2, and Q3 of FIG. 4.

The transistor "Q" and the digital circuit 30 of the electronic device ED may be formed at the same semiconductor substrate. The semiconductor substrate may be connected with the digital node XX of the digital circuit 30 and the collector node CC of the transistor "Q". The digital node XX may be supplied with the digital ground DGND. The collector node CC may be supplied with the analog ground AGND.

A first conductive region may be formed by implanting a first impurity into the semiconductor substrate. The first conductive region may be connected with the base node BB of the transistor "Q". The base node BB may be supplied with the analog ground AGND. The base node BB may be connected with the collector node CC.

A second conductive region may be formed by implanting a second impurity into the first conductive region. The second conductive region may be connected with the emitter node EE of the transistor "Q". The emitter node EE may be connected with any other node or element. For example, in the case where the transistor "Q" is the transistor Q1 of FIG. 4, the emitter node EE may be connected with the node $N_{11}$. For example, in the case where the transistor "Q" is the transistor Q2 of FIG. 4, the emitter node EE may be connected with the first resistor R1. For example, in the case where the transistor "Q" is the transistor Q3 of FIG. 4, the emitter node EE may be connected with the second resistor R2.

In example embodiments, the semiconductor substrate may be a P-type semiconductor substrate. The first impurity may be an N-type impurity. The first conductive region may be an N-type region. The second impurity may be a P-type impurity. The second conductive region may be a P-type region.

As illustrated in FIG. 6, an unwanted resistive connection (e.g., $R_{X4}$) may be occurred through the semiconductor substrate between the digital node XX and the collector node CC. Because a noise of the digital ground DGND is introduced to the analog ground AGND through the unwanted resistive connection, a way to reduce the influence according to the unwanted resistive connection (e.g., a way to increase a value corresponding to the unwanted resistive connection) is required.

Figure 7:
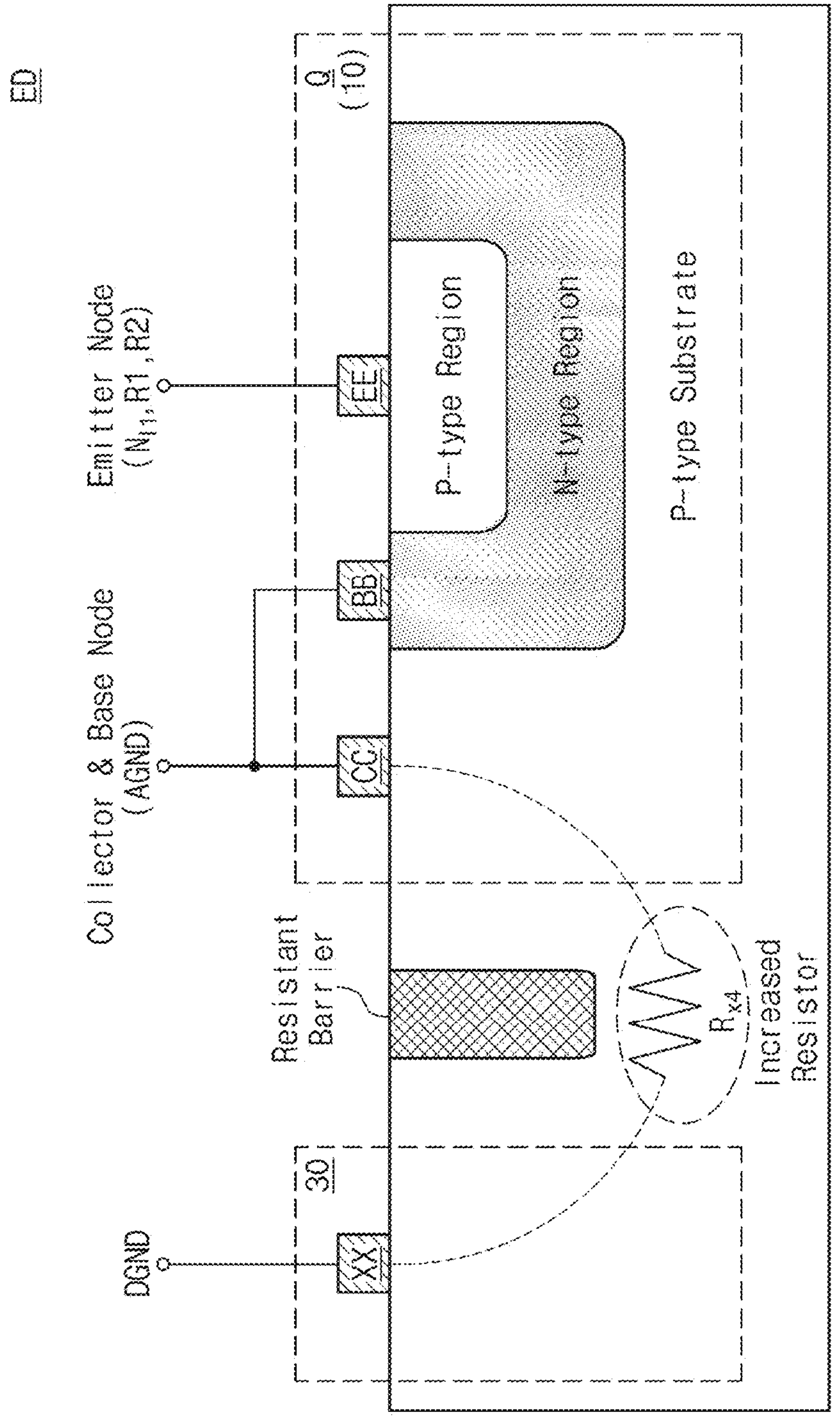
FIG. 7 is a diagram illustrating an electronic device according to example embodiments in detail.

FIG. 7 is a diagram illustrating the electronic device ED according to example embodiments in detail. Example embodiments in which the influence according to an unwanted resistive connection is reduced will be described with reference to FIG. 7. The transistor "Q" and the digital circuit 30 formed at the semiconductor substrate are similar to the transistor "Q" and the digital circuit 30 described with reference to FIG. 6, and thus, additional description will be omitted to avoid redundancy.

In example embodiments, a resistant barrier may be inserted into the semiconductor substrate of the electronic device ED. As the resistant barrier is inserted, a value corresponding to a resistive connection (e.g., $R_{X4}$) between the digital ground DGND and the analog ground AGND may increase. As such, the influence of a noise of the digital ground DGND on the analog ground AGND may be reduced.

Figure 8:
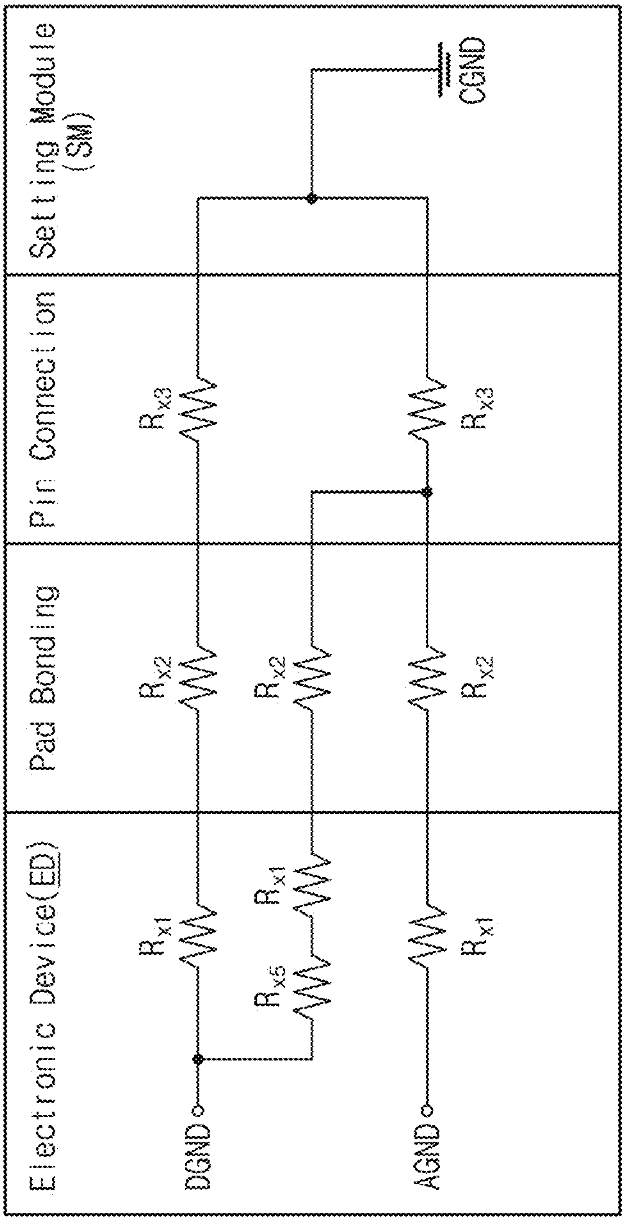
FIG. 8 is a diagram illustrating an electronic device according to example embodiments in detail.

FIG. 8 is a diagram illustrating the electronic device ED according to example embodiments in detail. Example embodiments in which the influence according to an unwanted resistive connection is reduced will be described with reference to FIG. 8. The common ground CGND and the resistors $R_{X1}$, $R_{X2}$, and $R_{X3}$ are similar to the common ground CGND and the resistors $R_{X1}$, $R_{X2}$, and $R_{X3}$ described with reference to FIG. 5, and thus, additional description will be omitted to avoid redundancy.

According to example embodiments of FIG. 8, a resistant barrier may be inserted into the semiconductor substrate of the electronic device ED, and a different pad bonding may be added. For example, the electronic device ED of FIG. 8 may correspond to the case where the digital ground DGND is further connected with a pin corresponding to the analog ground AGND through the different pad bonding, compared to example embodiments of FIG. 7.

In example embodiments, as the resistant barrier is inserted into the electronic device ED and a different pad bonding is added, the influence of a noise of the digital ground DGND on the analog ground AGND may be reduced. For example, a resistor $R_{X5}$ may be a resistor corresponding to the resistant barrier inserted into the semiconductor substrate of the electronic device ED. For example, the resistor $R_{X2}$ may be a resistor corresponding to the added pad bonding.

As the resistors $R_{X2}$ and $R_{X5}$ are added and a connection path between the grounds AGND and DGND, the influence of a noise of the digital ground DGND on the analog ground AGND may be expressed by Equation 4 below.

$$AGND_n = DGND_n \times \frac{R_{X3}}{R_{X1} + R_{X2} + R_{X3} + R_{X5}} \quad \text{[Equation 4]}$$

Equation 4 above is an equation indicating the influence $AGND_n$ of a noise of the digital ground DGND on the analog ground AGND $DGND_N$ is a noise of the digital ground DGND randomly assumed. Herein, $R_{X1}$ is an internal resistance value of the electronic device ED. $R_{X2}$ is a resistance value corresponding to a pad bonding. $R_{X3}$ is a resistance value corresponding to a pin connection. $R_{X5}$ is a resistance value corresponding to the resistant barrier inserted into the semiconductor substrate of the electronic device ED.

For example, when $DGND_n$ is 100 mV, each of $R_{X1}$, $R_{X2}$, and $R_{X3}$ is 100 mΩ, and $R_{X5}$ is 500Ω, $AGND_N$ calculated by using Equation 4 above may be 20 μV.

As described above, according to example embodiments of FIG. 8 in which a resistant barrier is inserted and a different pad bonding is added, the influence of a noise of the digital ground DGND on the analog ground AGND may be reduced. However, a process for adding a resistant barrier is further required, a pad for a pad bonding is added, and a noise introduced to the analog ground AGND is not sufficiently reduced. As such, another way to reduce a noise introduced to the analog ground AGND at the electronic device ED is required.

Figure 9:
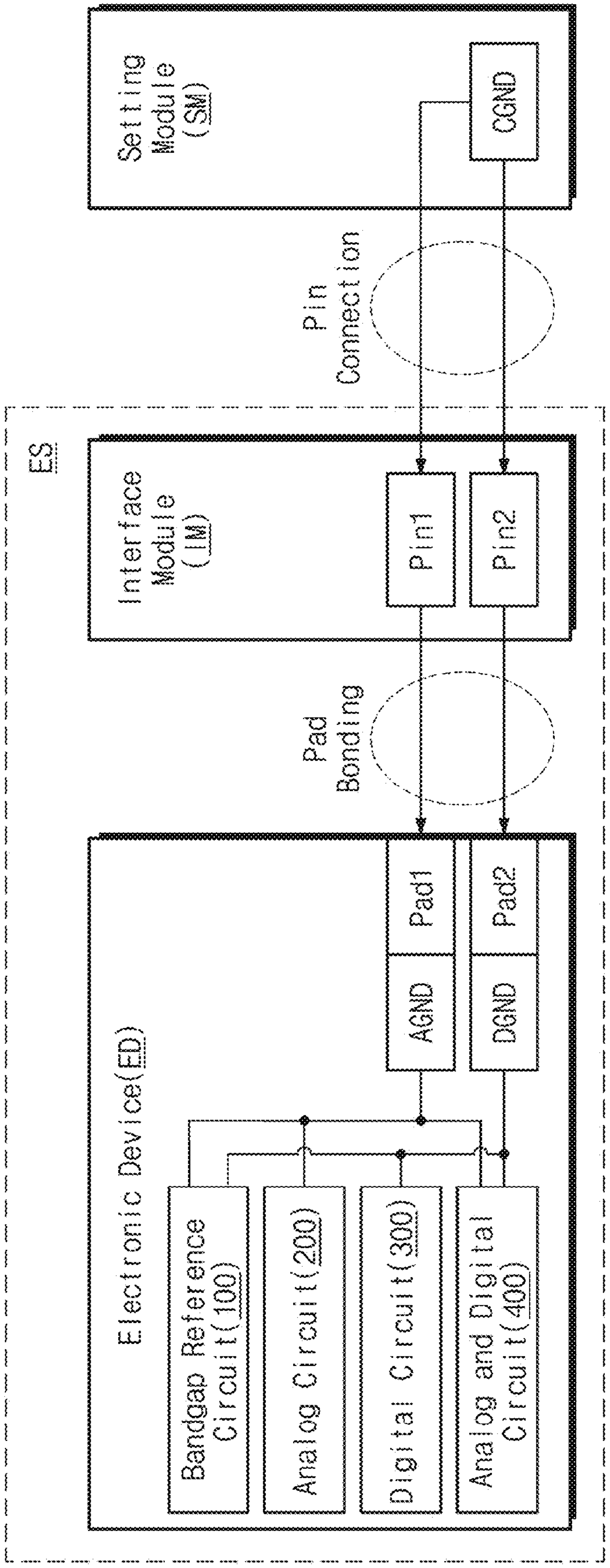
FIG. 9 is a block diagram illustrating an electronic system according to example embodiments of the present disclosure in detail.

FIG. 9 is a block diagram illustrating the electronic system ES according to example embodiments of the present disclosure in detail. Referring to FIG. 9, the electronic system ES according to example embodiments of the present disclosure is illustrated. The first pad, the second pad, the interface module IM, and the setting module SM are similar to the first pad, the second pad, the interface module IM, and the setting module SM described with reference to FIG. 2, and thus, additional description will be omitted to avoid redundancy.

The electronic device ED may include a bandgap reference circuit 100, an analog circuit 200, a digital circuit 300, and/or an analog and digital circuit 400. Unlike the electronic device ED of FIG. 2, the bandgap reference circuit 100 of the electronic device ED may be further connected with the digital ground DGND as well as the analog ground AGND.

In example embodiments, the first power received through the first pad may be applied to the bandgap reference circuit 100, the analog circuit 200, and the analog and digital circuit 400. For example, the first power may be the analog ground AGND.

In example embodiments, the second power received through the second pad may be applied to the bandgap reference circuit 100, the digital circuit 300, and the analog and digital circuit 400. For example, the second power may be the digital ground DGND.

The bandgap reference circuit 100 according to example embodiments of the present disclosure may operate based on the first power and the second power. As the bandgap reference circuit 100 operates based on both the first power and the second power, the bandgap reference circuit 100 may generate the reference voltage $V_{REF}$ more insensitive to the PVT (e.g., than example embodiments of FIG. 2). The bandgap reference circuit 100 will be more fully described with reference to FIG. 10.

Figure 10:
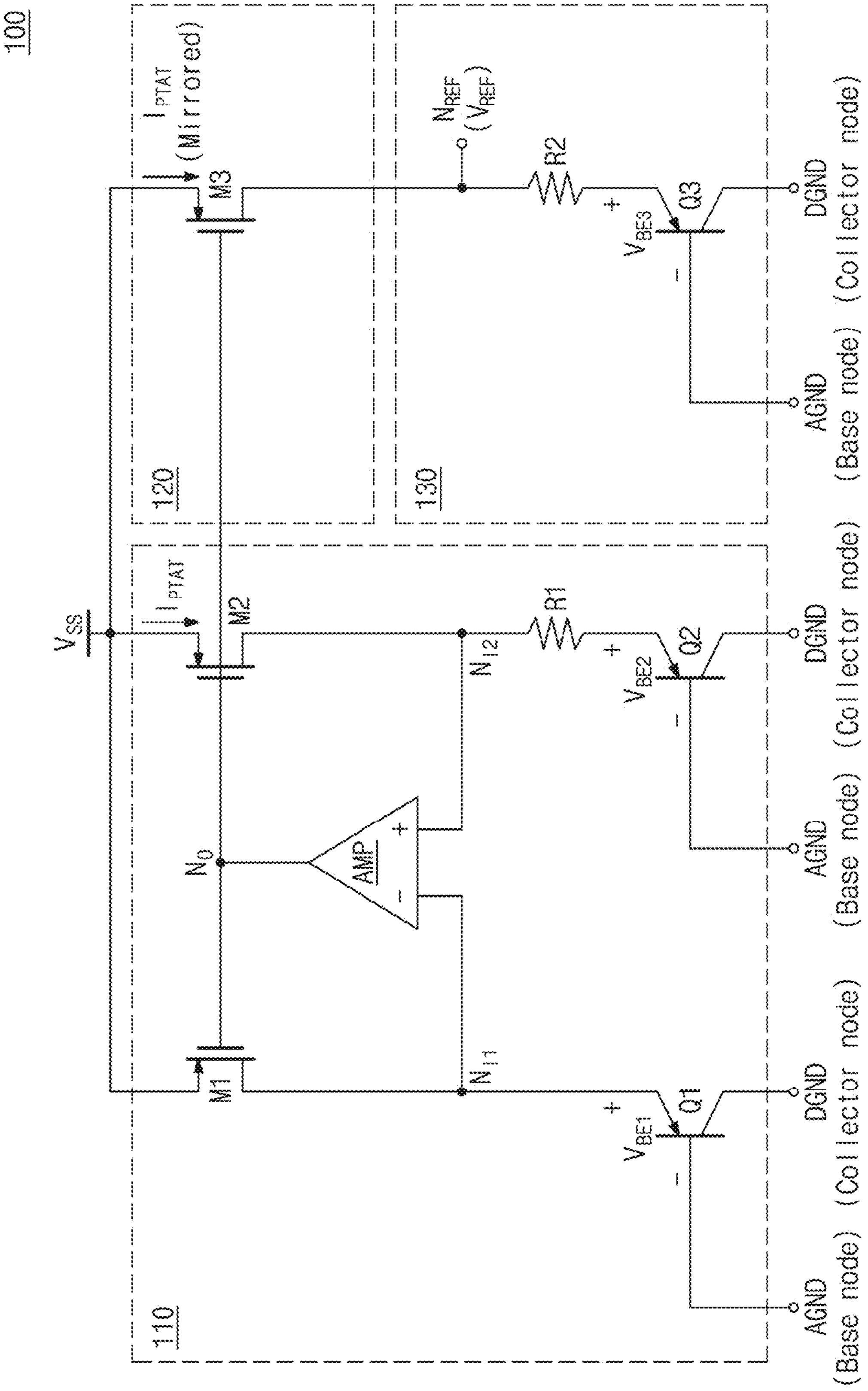
FIG. 10 is a circuit diagram illustrating a bandgap reference circuit of FIG. 9 in detail.

FIG. 10 is a circuit diagram illustrating the bandgap reference circuit 100 of FIG. 9 in detail. Referring to FIG. 10, the bandgap reference circuit 100 that includes a PTAT current generator 110, a mirrored current generator 120, and/or a reference voltage generator 130 is illustrated. Unlike the bandgap reference circuit 10 of FIG. 4, the bandgap reference circuit 100 may operate further based on the digital ground DGND. The transistors M1, M2, and M3, the amplifier AMP, and the resistors R1 and R2 are similar to the transistors M1, M2, and M3, the amplifier AMP, and the resistors R1 and R2 described with reference to FIG. 4, and thus, additional description will be omitted to avoid redundancy.

The transistor Q1 may be connected between the first input node $N_{11}$ and the ground GND and may operate in response to the analog ground AGND. For example, the transistor Q1 may include an emitter node connected with the first input node $N_{11}$, a base node supplied with the analog ground AGND, and a collector node connected with the digital ground DGND. In example embodiments, the transistor Q1 may be a PNP-type BJT.

The transistor Q2 may be connected between the first resistor R1 and the digital ground DGND and may operate in response to the analog ground AGND. For example, the transistor Q2 may include an emitter node connected with the first resistor R1, a base node supplied with the analog ground AGND, and a collector node connected with the digital ground DGND. In example embodiments, the transistor Q2 may be a PNP-type BJT.

The transistor Q3 may be connected between the second resistor R2 and the digital ground DGND and may operate in response to the analog ground AGND. For example, the transistor Q3 may include an emitter node connected with the second resistor R2, a base node supplied with the analog ground AGND, and a collector node connected with the digital ground DGND. In example embodiments, the transistor Q3 may be a PNP-type BJT.

In example embodiments, the base node and the collector node of each of the transistors Q1, Q2, and Q3 of the bandgap reference circuit 100 may be electrically separated from each other. For example, the digital ground DGND may be supplied to the collector node of at least one of the transistors Q1, Q2, and Q3, and the analog ground AGND may be supplied to the base node thereof. The grounds AGND and DGND in the electronic device ED or the electronic system ES may be electrically separated from each other. That the grounds AGND and DGND are electrically separated from each other may mean that a resistance value (e.g., $R_{X4}$) corresponding to an unwanted resistive connection between the grounds AGND and DGND increases greatly.

For example, the influence $AGND_n$ of a noise of the digital ground DGND on the analog ground AGND may be calculated by using Equation 3 above. For example, when each of the resistors $R_{X1}$, $R_{X2}$, and $R_{X3}$ is 100 mΩ, $R_{X4}$ experimentally measured may be about 500 kΩ. In the case where $DGND_n$ is 100 mV, a value of $AGND_n$ calculated by using Equation 3 above is about 60 nV. The $AGND_n$ calculated value may be smaller than $AGND_n$ values calculated in other example embodiments (e.g., example embodiments of FIGS. 5 and 8).

As described above, according to example embodiments of the present disclosure, the bandgap reference circuit 100 in which heterogeneous power is supplied to a transistor (e.g., at least one of Q1, Q2, and Q3) is provided. As the influence of a noise of the digital ground DGND on the analog ground AGND decreases greatly, the bandgap reference circuit 100 may generate the reference voltage $V_{REF}$ more insensitive to the PVT.

Figure 11:
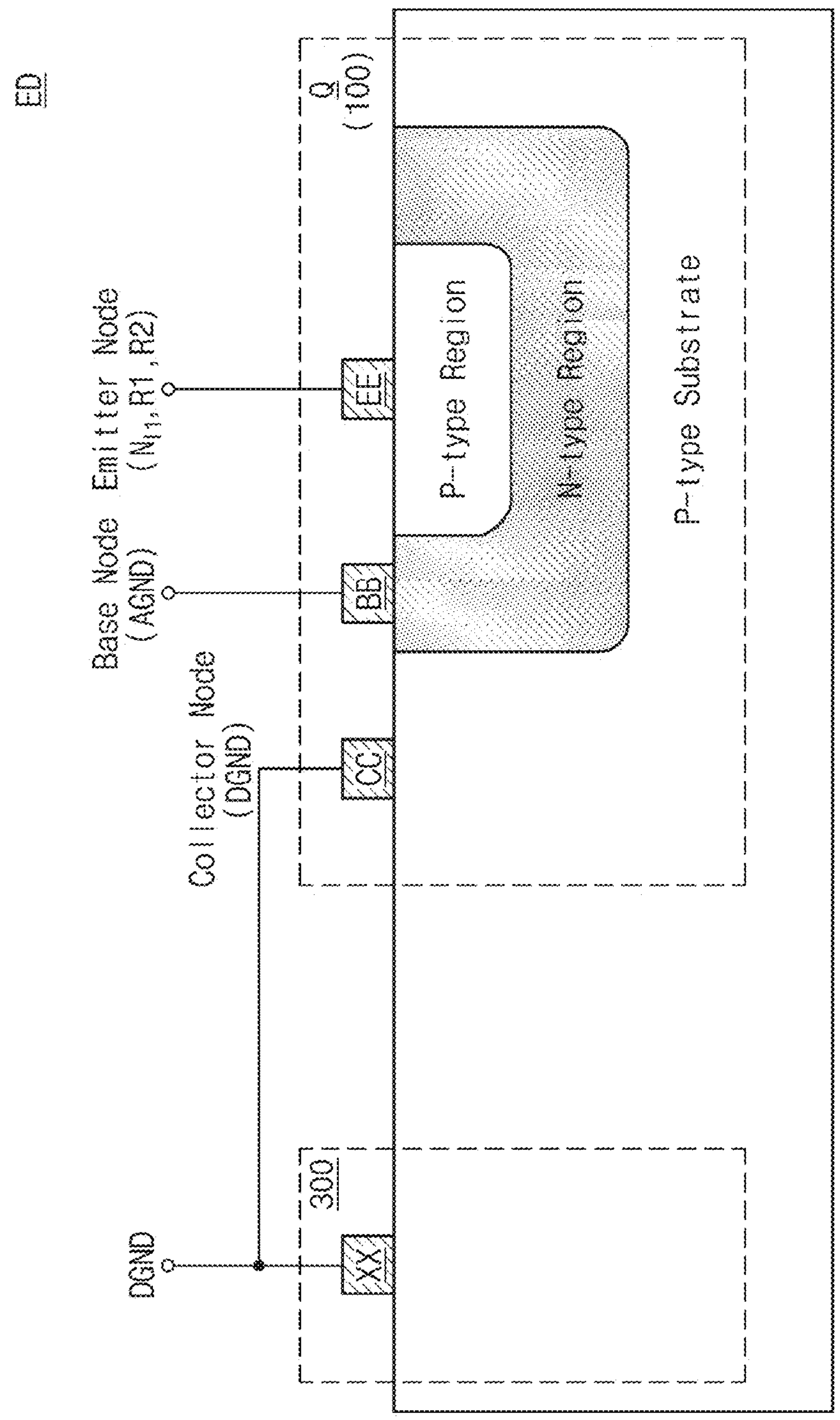
FIG. 11 is a diagram illustrating an electronic device of FIG. 9 in detail.

FIG. 11 is a diagram illustrating the electronic device ED of FIG. 9 in detail. Example embodiments in which heterogeneous power is supplied to the transistor "Q" will be described with reference to FIG. 11. The transistor "Q" may be one of the transistors Q1, Q2, and Q3 of FIG. 10. The transistor "Q" and the digital circuit 300 formed at the semiconductor substrate are similar to the transistor "Q" and the digital circuit 30 described with reference to FIG. 6, and thus, additional description will be omitted to avoid redundancy.

The transistor "Q" of the bandgap reference circuit 100 may include a collector node CC supplied with the digital ground DGND, a base node BB supplied with the analog ground AGND, and an emitter node EE connected with any other node or element. For example, unlike the collector node CC of FIG. 6 or 7, the collector node CC may be supplied with the digital ground DGND. The collector node CC may be connected with the digital node XX of the digital circuit 300.

Instead of supplying the same ground (e.g., AGND) to all the nodes CC and BB of the bandgap reference circuit 100, the electronic device ED in which a resistive connection between the analog ground AGND and the digital ground DGND is increased may be provided by supplying the digital ground DGND to the collector node CC of the bandgap reference circuit 100 and providing the analog ground AGND to the base node BB thereof. For example, the increase of the resistive connection between the analog ground AGND and the digital ground DGND may indicate an increase of a resistance between the analog ground AGND and the digital ground DGND, thus a leakage current between the analog ground AGND and the digital ground DGND may be decreased.

Figure 12:
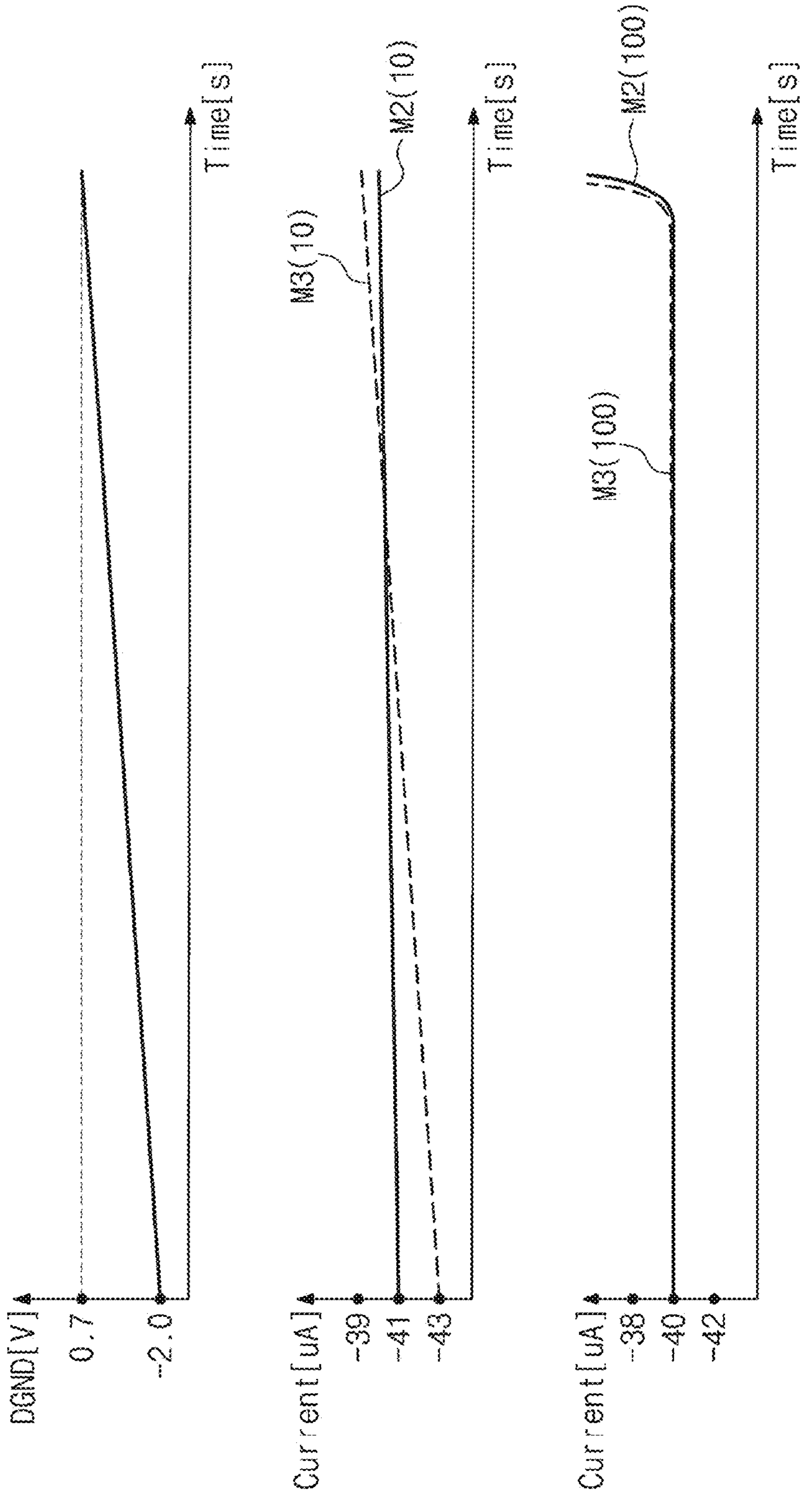
FIG. 12 is a graph illustrating PTAT currents measured at bandgap reference circuits to which a DC noise is introduced.

FIG. 12 is a graph illustrating the PTAT currents $I_{PTAT}$ measured at the bandgap reference circuits 10 and 100 to which a DC noise is introduced. Referring to FIG. 12, a graph showing a DC noise of the digital ground DGND, a graph showing the PTAT current $I_{PTAT}$ measured when the same ground is applied to the bandgap reference circuit 10 according to example embodiments of FIG. 4, and a graph showing the PTAT current $I_{PTAT}$ measured when different grounds are applied to the bandgap reference circuit 100 according to example embodiments of FIG. 10 are illustrated. The graphs illustrated in FIG. 12 share the same time axis.

Referring to the graph showing the DC noise of the digital ground DGND, a horizontal axis represents a time, and a vertical axis represents a voltage magnitude of the digital ground DGND. In example embodiments, a magnitude of the digital ground DGND may increase from −2 V to 0.7 V over time. The digital ground DGND may be supplied to the transistors Q1, Q2, and Q3 of the bandgap reference circuit 10 or the transistors Q1, Q2, and Q3 of the bandgap reference circuit 100.

Referring to the graph showing the PTAT current $I_{PTAT}$ measured when the same ground is applied to the bandgap reference circuit 10, a horizontal axis represents a time, and a vertical axis represents a magnitude of a current. A solid line indicates the PTAT current $I_{PTAT}$ output from the transistor M2. A dashed line indicates the mirrored PTAT current $I_{PTAT}$ output from the transistor M3.

In example embodiments, in the bandgap reference circuit 10 to which the digital ground DGND increasing from −2 V to 0.7 V is applied, the PTAT current $I_{PTAT}$ of the transistor M2 may be almost uniform, while the mirrored PTAT current $I_{PTAT}$ of the transistor M3 may change between about −43 μA to about −39 μA. That is, the bandgap reference circuit 10 to which the same ground is applied may be less insensitive to the PVT.

Referring to the graph showing the PTAT current $I_{PTAT}$ measured when different grounds are applied to the bandgap reference circuit 100, a horizontal axis represents a time, and a vertical axis represents a magnitude of a current. A solid line indicates the PTAT current $I_{PTAT}$ output from the transistor M2. A dashed line indicates the mirrored PTAT current $I_{PTAT}$ output from the transistor M3.

In example embodiments, in the bandgap reference circuit 100 to which the digital ground DGND increasing from −2 V to 0.7 V is applied, the PTAT current $I_{PTAT}$ of the transistor M2 may be almost uniform, and the mirrored PTAT current $I_{PTAT}$ of the transistor M3 may also be almost uniform. That is, the bandgap reference circuit 100 to which different grounds are applied may be more insensitive to the PVT than the bandgap reference circuit 10 to which the same ground is applied.

Figure 13:
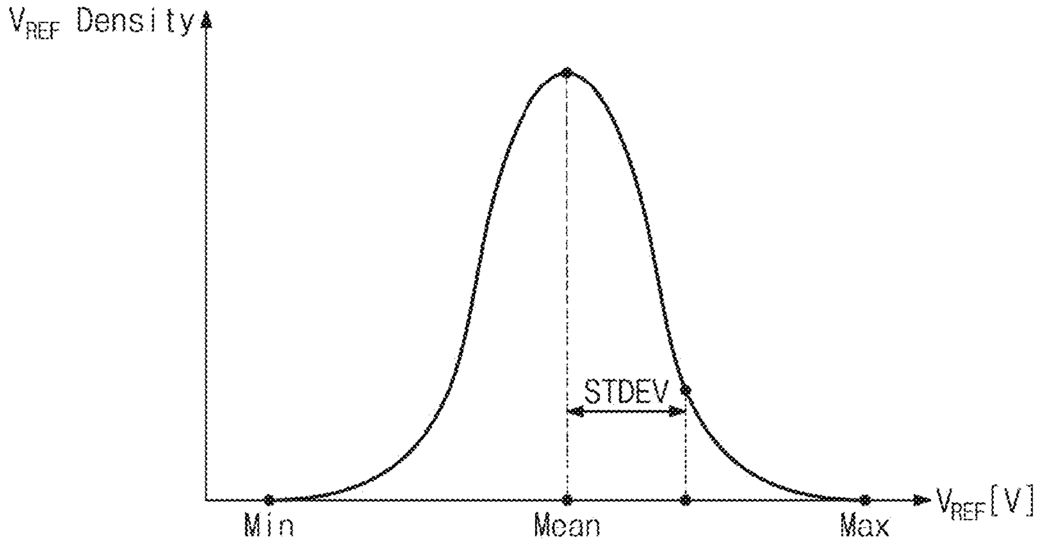
FIG. 13 is a graph illustrating a distribution of a reference voltage at a bandgap reference circuit to which a DC noise is introduced.

FIG. 13 is a graph illustrating a distribution of the reference voltage $V_{REF}$ at the bandgap reference circuit 100 to which a DC noise is introduced. Referring to FIG. 13, when a DC noise of any digital ground DGND is introduced to the bandgap reference circuit 100 according to example embodiments of FIG. 10, a graph showing a distribution of the reference voltage $V_{REF}$ measured at the bandgap reference circuit 100 is illustrated. A horizontal axis represents a magnitude of the reference voltage $V_{REF}$, and a vertical axis represents a density of the reference voltage $V_{REF}$ distributed.

In example embodiments, the reference voltage $V_{REF}$ measured at the bandgap reference circuit 100 may have a normal distribution. The reference voltage $V_{REF}$ may have a minimum value, a maximum value, an average value, and a standard deviation.

In example embodiments, the following Table 1 shows a standard deviation, a minimum value, and a maximum value of the reference voltage $V_{REF}$ measured when a DC noise of the digital ground DGND is introduced to the bandgap reference circuit 100 within a range from −0.3 V to 0.3 V.

TABLE 1

| DGND[V] | −0.3 | −0.2 | −0.1 | 0 | 0.1 | 0.2 | 0.3 |
|---|---|---|---|---|---|---|---|
| STDEV[V] | 0.012732 | 0.012730 | 0.012729 | 0.012729 | 0.012729 | 0.012724 | 0.012733 |
| $V_{REF\_Min}$ | 1.1949 | 1.1949 | 1.1949 | 1.1949 | 1.1949 | 1.1949 | 1.1949 |
| $V_{REF\_Max}$ | 1.2304 | 1.2304 | 1.2304 | 1.2304 | 1.2304 | 1.2304 | 1.2304 |

The reference voltage $V_{REF}$ measured at the bandgap reference circuit 100 to which a DC noise of the digital ground DGND is introduced will be described with reference to Table 1. DGND provided to the transistors Q1, Q2, and Q3 of the bandgap reference circuit 100 may increase from −0.3 V to 0.3 V in units of 0.1 V. STDEV is a standard deviation of the reference voltage $V_{REF}$ measured at the corresponding DGND. $V_{REF\_Min}$ is a minimum value of the reference voltage $V_{REF}$ measured at the corresponding DGND. $V_{REF\_Max}$ is a maximum value of the reference voltage $V_{REF}$ measured at the corresponding DGND. Referring to the measured values of Table 1, even in the fluctuations of the digital ground DGND, the bandgap reference circuit 100 to which heterogeneous power is applied may generate the reference voltage $V_{REF}$ insensitive to the PVT.

Figure 14:
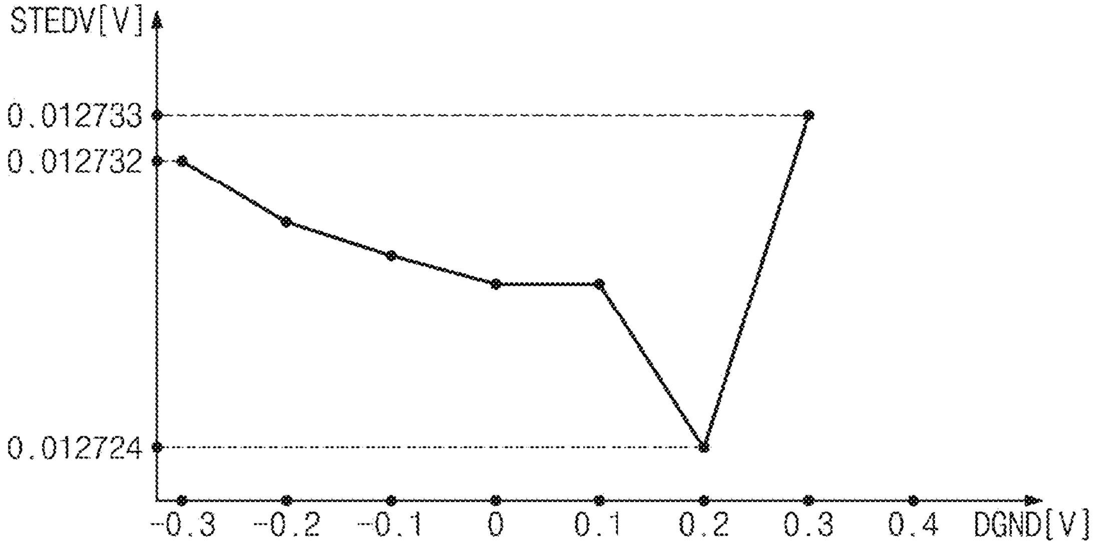
FIG. 14 is a graph illustrating a standard deviation of a reference voltage at a bandgap reference circuit to which a DC noise is introduced.

FIG. 14 is a graph illustrating a standard deviation of the reference voltage $V_{REF}$ at the bandgap reference circuit 100 to which a DC noise is introduced. Referring to FIG. 14, a graph showing standard deviations STDEV in the bandgap reference circuit 100, which correspond to digital grounds DGND of Table 1 above, is illustrated.

A horizontal axis represents a magnitude of the digital ground DGND supplied to the transistors Q1, Q2, and Q3 of the bandgap reference circuit 100, and a vertical axis represents a standard deviation of the reference voltage $V_{REF}$ measured. Referring to the graph of FIG. 14, the standard deviations STDEV have a relatively uniform value.

As described above, the digital ground DGND may be a power at which a noise occurs frequently or greatly compared to the analog ground AGND. However, as described with reference to FIGS. 12, 13, and 14, even though a DC noise of the digital ground DGND is introduced to the transistors Q1, Q2, and Q3 of the bandgap reference circuit 100 operating based on heterogeneous powers, the bandgap reference circuit 100 may generate the reference voltage $V_{REF}$ of a uniform magnitude. That is, the bandgap reference circuit 100 according to example embodiments of the present disclosure may be strong on a DC noise of the digital ground DGND.

Figure 15:
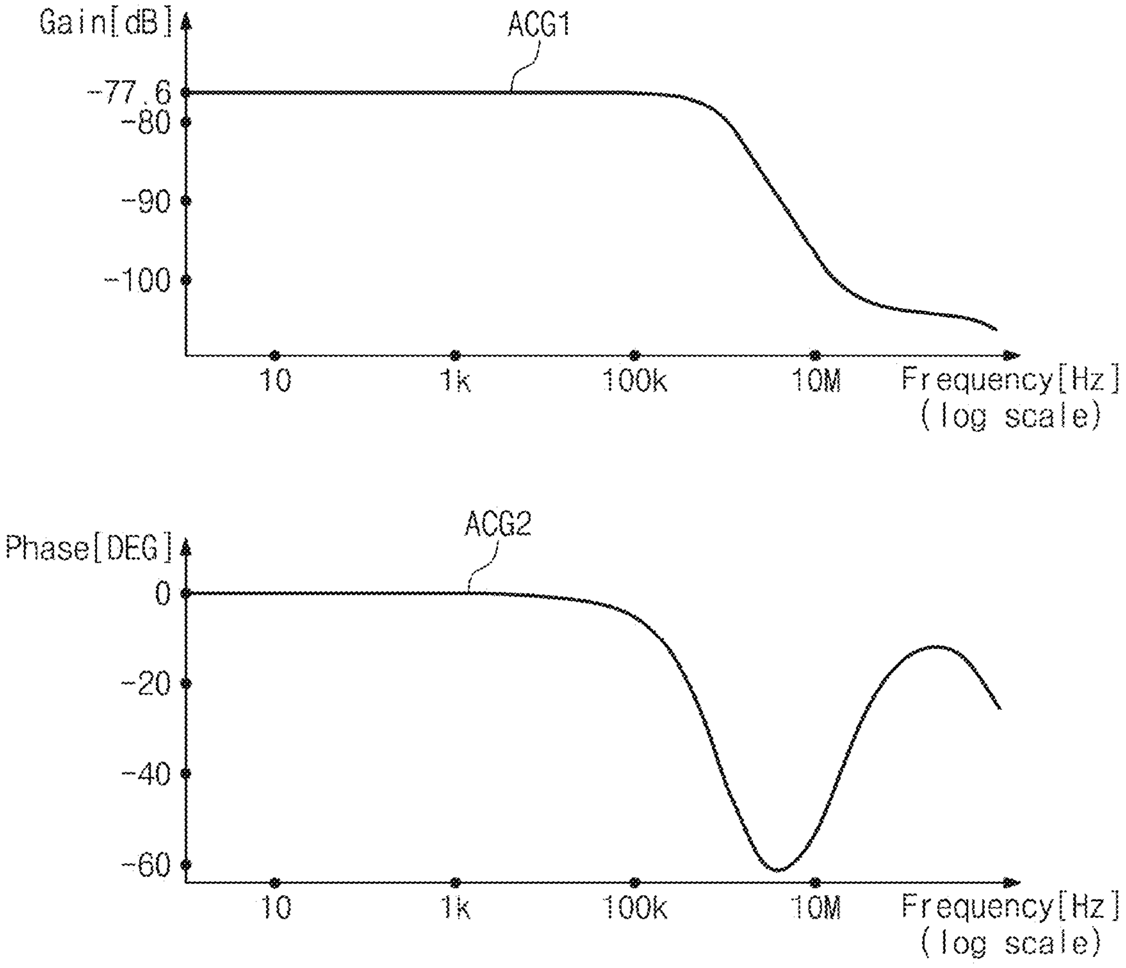
FIG. 15 is a graph illustrating a gain and a phase at a bandgap reference circuit to which an AC noise is introduced.

FIG. 15 is a graph illustrating a gain and a phase at the bandgap reference circuit 100 to which an AC noise is introduced. Referring to FIGS. 10 and 15, in the bandgap reference circuit 100 of FIG. 10 to which an AC noise of the digital ground DGND is introduced, a graph ACG1 showing a gain of the measured reference voltage $V_{REF}$ to the digital ground DGND and a graph ACG2 showing a phase of the measured reference voltage $V_{REF}$ to the digital ground DGND are illustrated.

Referring to the graph ACG1, a horizontal axis represents a frequency of a log scale, and a vertical axis represents a gain. In example embodiments, the gain of the measured reference voltage $V_{REF}$ to the digital ground DGND may have a value within a specific range at an operating frequency. The operating frequency may be a frequency within a range where the bandgap reference circuit 100 operates. For example, at an operating frequency of the bandgap reference circuit 100, the gain of the measured reference voltage $V_{REF}$ to the digital ground DGND may be about −77.6 dB. As such, even though an AC noise of the digital ground DGND is introduced to the bandgap reference circuit 100, the bandgap reference circuit 100 may generate the reference voltage $V_{REF}$ of a uniform magnitude.

Referring to the graph ACG2, a horizontal axis represents a frequency of a log scale, and a vertical axis represents a phase. In example embodiments, the phase of the measured reference voltage $V_{REF}$ to the digital ground DGND may have a value within a specific range at an operating frequency. As such, an abnormal operation such as oscillation may not occur at the bandgap reference circuit 100.

Figure 16A:
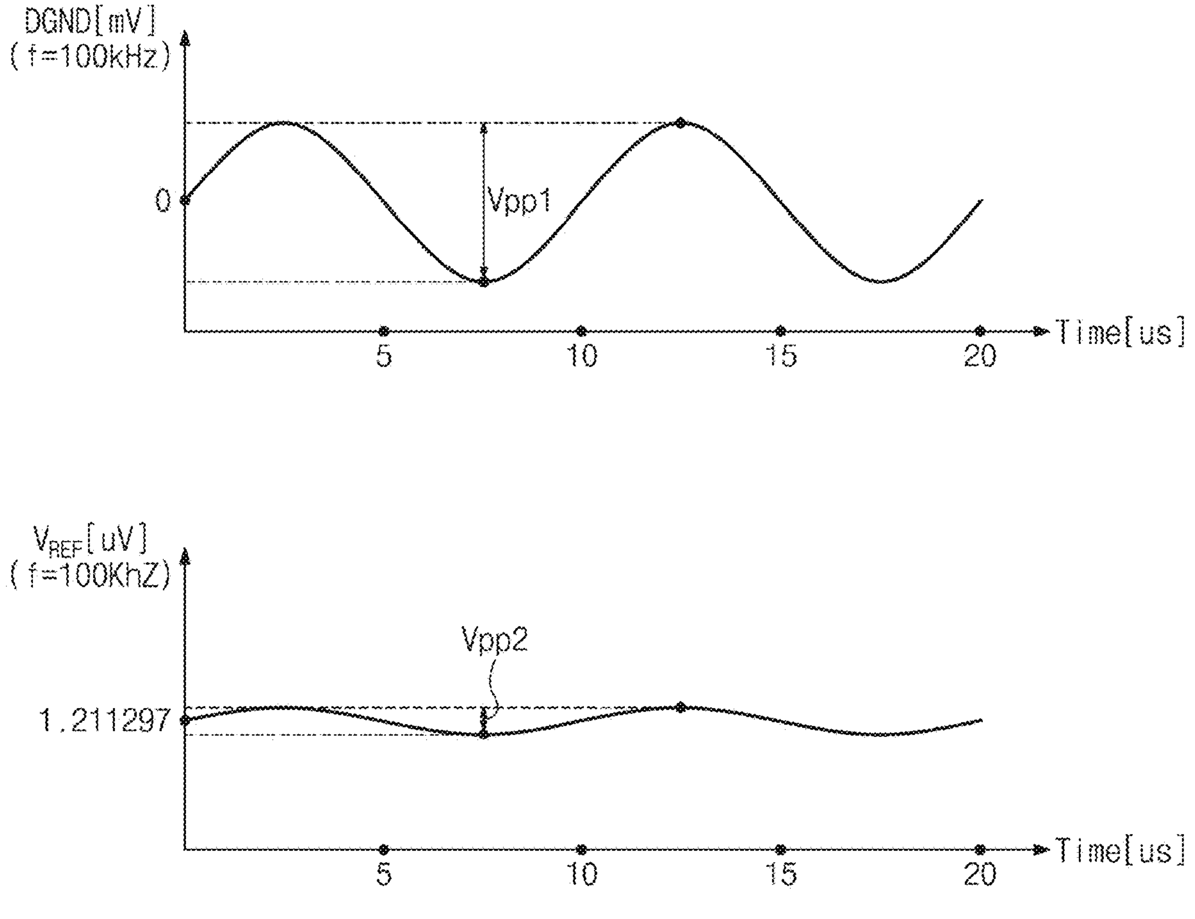
FIGS. 16A and 16B are graphs illustrating waveforms of a reference voltage at a bandgap reference circuit to which an AC noise is introduced.
Figure 16B:
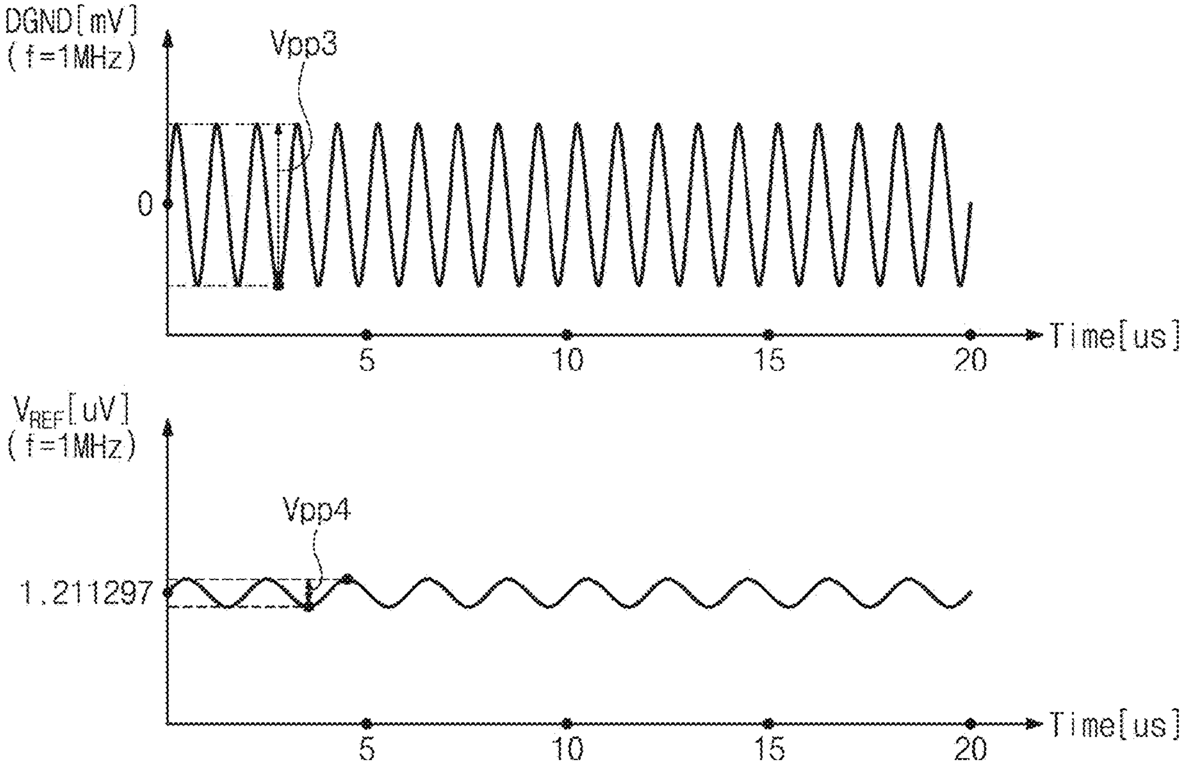

FIGS. 16A and 16B are graphs illustrating waveforms of the reference voltage $V_{REF}$ at the bandgap reference circuit 100 to which an AC noise is introduced. Referring to FIGS. 10 and 16A, in example embodiments in which an AC noise of the digital ground DGND has a frequency of 100 kHz, a graph showing a waveform of the digital ground DGND and a graph showing a waveform of the measured reference voltage $V_{REF}$ are illustrated. A horizontal axis represents a time, and a vertical axis represents a voltage.

In example embodiments, in the case where an AC noise of the digital ground DGND, which has a frequency of 100 kHz, has a first peak-to-peak voltage Vpp1, the reference voltage $V_{REF}$ measured at the bandgap reference circuit 100 may have a second peak-to-peak voltage Vpp2. The second peak-to-peak voltage Vpp2 may be smaller than the first peak-to-peak voltage Vpp1. That is, the bandgap reference circuit 100 may operate normally even though the AC noise of the digital ground DGND, which has a frequency of 100 kHz, is introduced thereto.

Referring to FIGS. 10 and 16B, in example embodiments in which an AC noise of the digital ground DGND has a frequency of 1 MHz, a graph showing a waveform of the digital ground DGND and a graph showing a waveform of the measured reference voltage $V_{REF}$ are illustrated. A horizontal axis represents a time, and a vertical axis represents a voltage.

In example embodiments, in the case where an AC noise of the digital ground DGND, which has a frequency of 1 MHz, has a third peak-to-peak voltage Vpp3, the reference voltage $V_{REF}$ measured at the bandgap reference circuit 100 may have a fourth peak-to-peak voltage Vpp4. The fourth peak-to-peak voltage Vpp4 may be smaller than the third peak-to-peak voltage Vpp3. That is, the bandgap reference circuit 100 may operate normally even though the AC noise of the digital ground DGND, which has a frequency of 1 MHz, is introduced thereto.

As described above, the digital ground DGND may be a power at which a noise occurs frequently or greatly compared to the analog ground AGND. However, as described with reference to FIGS. 15, 16A, and 16B, even though an AC noise of the digital ground DGND is introduced to the transistors Q1, Q2, and Q3 of the bandgap reference circuit 100 operating based on heterogeneous powers, the bandgap reference circuit 100 may generate the reference voltage $V_{REF}$ of a uniform magnitude. Also, an abnormal operation such as oscillation may be reduced at the bandgap reference circuit 100. That is, the bandgap reference circuit 100 according to example embodiments of the present disclosure may be strong on an AC noise of the digital ground DGND.

Figure 17:
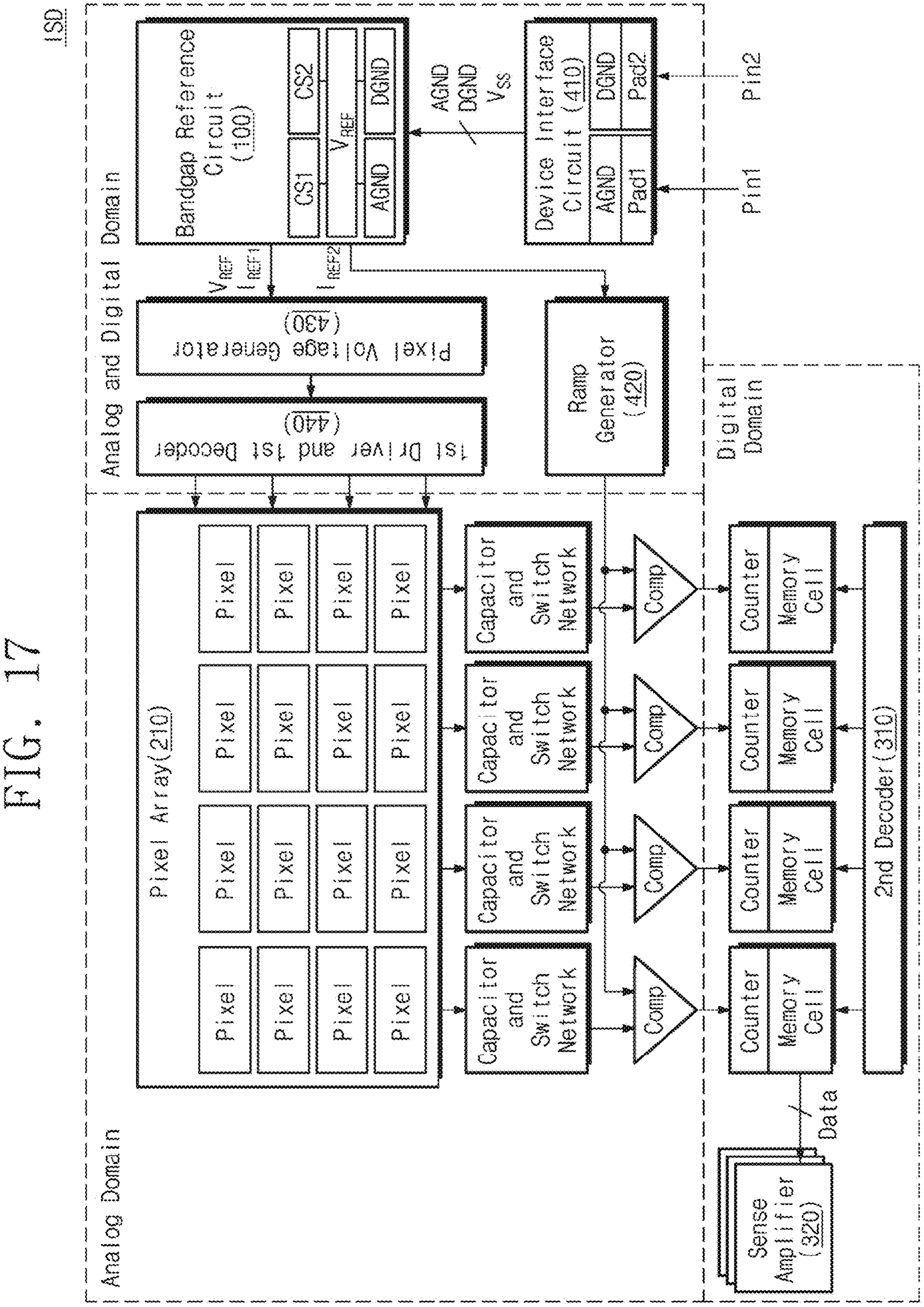
FIG. 17 is a block diagram illustrating an image sensor device according to example embodiments of the present disclosure.

FIG. 17 is a block diagram illustrating an image sensor device ISD according to example embodiments of the present disclosure. The image sensor device ISD according to example embodiments of the present disclosure is illustrated in FIG. 17. The image sensor device ISD may be an implementation example of the electronic device ED of FIG. 9. The image sensor device ISD may be a semiconductor chip included in a digital camera, a smartphone, a tablet, a laptop, etc. The image sensor device ISD may operate in an analog domain, a digital domain, and an analog and digital domain.

For example, an analog signal such as the analog ground AGND may be used in the analog domain. A digital signal such as the digital ground DGND may be used in the digital domain. Both the analog signal such as the analog ground AGND and the digital signal such as the digital ground DGND may be used in the analog and digital domain.

Connection lines are omitted to prevent a drawing from being complicated. However, the analog ground AGND received from a first pin may be provided to at least one circuit included in the analog domain and may be provided to at least one circuit included in the analog and digital domain. Also, the digital ground DGND received from a second pin may be provided to at least one circuit included in the digital domain and may be provided to at least one circuit included in the analog and digital domain.

The image sensor device ISD may include circuits of the analog domain, circuits of the digital domain, and circuits of the analog and digital domain. For example, the image sensor device ISD may include a pixel array 210, a capacitor and switch network, and a comparator that are used in the analog domain. The image sensor device ISD may include a counter, a memory cell, a second decoder 310, and a sense amplifier that are used in the digital domain. The image sensor device ISD may include the bandgap reference circuit 100, a device interface circuit 410, a ramp generator 420, a pixel voltage generator 430, and/or a first driver and first decoder 440 that are used in the analog and digital domain.

The device interface circuit 410 may include a first pad and a second pad. The analog ground AGND may be formed at the first pad, based on a power received from the first pin. The digital ground DGND may be formed at the second pad, based on a power received from the second pin. The device interface circuit 410 may receive the power supply voltage $V_{SS}$ from a separate power module (not illustrated). The device interface circuit 410 may transmit powers (e.g., AGND, DGND, and $V_{SS}$) to the bandgap reference circuit 100 through separate transmission paths.

The bandgap reference circuit 100 may generate the reference voltage $V_{REF}$ based on the powers (e.g., AGND, DGND, and $V_{SS}$) received from the device interface circuit 410. In example embodiments, the bandgap reference circuit 100 may further include a current source configured to output a reference current based on the reference voltage $V_{REF}$.

For example, the bandgap reference circuit 100 may further include a first current source CS1 configured to output a first reference current $I_{REF1}$ based on the reference voltage $V_{REF}$. The first reference current $I_{REF1}$ may have a current insensitive to the PVT. For example, the bandgap reference circuit 100 may further include a second current source CS2 configured to output a second reference current $I_{REF2}$ based on the reference voltage $V_{REF}$. The second reference current $I_{REF2}$ may have a current insensitive to the PVT. The second reference current $I_{REF2}$ may be a current that is used in a circuit different from a circuit in which the first reference current $I_{REF1}$ is used.

In example embodiments, the bandgap reference circuit 100 may output the reference voltage $V_{REF}$ and the first reference current $I_{REF1}$ to the pixel voltage generator 430. The bandgap reference circuit 100 may output the second reference current $I_{REF2}$ to the ramp generator 420.

The ramp generator 420 may generate a ramp power based on the second reference current $I_{REF2}$. The ramp generator 420 may output the ramp power to the comparator of the analog domain. The ramp power may be a power signal that is used in a comparison operation of the comparator.

The pixel voltage generator 430 may generate a pixel voltage based on the reference voltage $V_{REF}$ and the first reference current $I_{REF1}$. The pixel voltage generator 430 may output the pixel voltage to the first driver and first decoder 440. The pixel voltage may be a power signal that is used for the first driver and first decoder 440 to control pixels of the pixel array 210. The first driver and first decoder 440 may control pixels of the pixel array 210 based on the pixel voltage received from the pixel voltage generator 430.

The pixel array 210 may include a plurality of pixels arranged in a first direction and a second direction. Each of the pixels may generate an image signal under control of the first driver and first decoder 440. Each of the pixels may output an image signal to the corresponding capacitor and switch network. That is, the pixel array 210 may be a circuit that is driven based on the pixel voltage of the pixel voltage generator 430 and is configured to output a plurality of image signals.

The capacitor and switch network may be connected with the corresponding comparator. The capacitor and switch network may output an image signal received from the corresponding pixel of the pixel array 210 to the comparator.

The comparator may perform a comparison operation based on the image signal received from the capacitor and switch network and the ramp voltage received from the ramp generator 420. The comparator may output a comparison signal being a result of performing the comparison operation to the counter. For example, when a magnitude of an image signal is greater than a magnitude of the ramp voltage, the comparator may output the comparison signal of a first voltage level. When the magnitude of the image signal is smaller than the magnitude of the ramp voltage, the comparator may output the comparison signal of a second voltage level.

The counter may receive the comparison signal from the corresponding comparator. The counter may determine a count value based on the received comparison signal. For example, the counter may count the comparison signal having the first voltage level from among comparison signals received from the comparator within a specific time. The counter may output a signal indicating the determined count value to the corresponding memory cell.

The memory cell may store data based on the signal received from the counter. The memory cell may be connected with the sense amplifier 320. The second decoder 310 may control a plurality of memory cells. For example, the second decoder 310 may control a memory cell such that a data signal is output to the sense amplifier 320 corresponding to the memory cell.

As described above, the bandgap reference circuit 100 according to example embodiments of the present disclosure may be a circuit that is included in the image sensor device ISD. Also, the bandgap reference circuit 100 may generate a current (e.g., the first reference current $I_{REF1}$ or the second reference current $I_{REF2}$) insensitive to the PVT based on the reference voltage $V_{REF}$.

Figure 18:
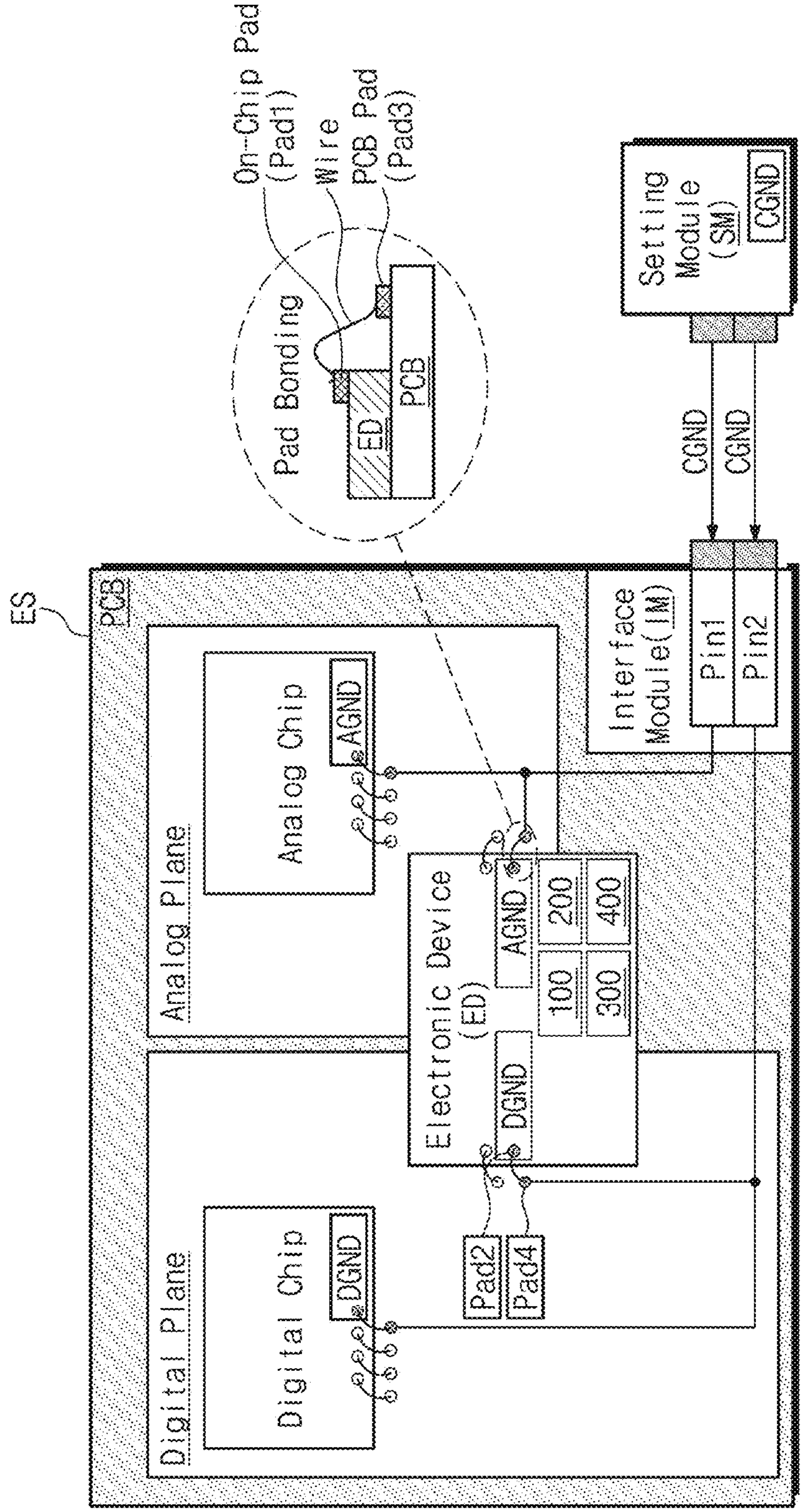
FIG. 18 is a block diagram illustrating an electronic system according to example embodiments of the present disclosure.

FIG. 18 is a block diagram illustrating the electronic system ES according to example embodiments of the present disclosure in detail. Referring to FIG. 18, the electronic system ES including a semiconductor chip implemented at a printed circuit board (PCB) is illustrated. The electronic system ES may include the interface module IM, the electronic device ED, an analog chip, and/or a digital chip. The electronic device ED may include the bandgap reference circuit 100, the analog circuit 200, the digital circuit 300, and/or the analog and digital circuit 400.

The analog chip may be a semiconductor chip that operates based on an analog signal such as the analog ground AGND. The digital chip may be a semiconductor chip that operates based on a digital signal such as the digital ground DGND. Unlike the analog circuit 200 and the digital circuit 300 formed at a semiconductor substrate of the electronic device ED, the analog chip and the digital chip may be a semiconductor chip that is manufactured or used independently of the electronic device ED.

In example embodiments, the electronic system ES may include the interface module IM, the electronic device ED, the analog chip, and/or the digital chip that are implemented at the PCB. For example, the analog chip may be deposited at an analog plane of the PCB. The digital chip may be deposited at a digital plane of the PCB. The electronic device ED may be deposited at the analog plane and the digital plane of the PCB.

The interface module IM may include a first pin and a second pin. The first pin may receive the common ground CGND from the setting module SM through a first pin connection. The second pin may receive the common ground CGND from the setting module SM through a second pin connection. The first pin may be connected with the electronic device ED and the analog chip. The common ground CGND input to the first pin may be used as the analog ground AGND at the electronic device ED and the analog chip. The second pin may be connected with the electronic device ED and the digital chip. The common ground CGND input to the second pin may be used as the digital ground DGND at the electronic device ED and the digital chip.

In example embodiments, a pad bonding may be implemented through a wire connecting a pad of a semiconductor device, such as the electronic device ED, and a pad of the PCB. For example, referring to the pad bonding providing the analog ground AGND of the electronic device ED, the electronic device ED may include a first pad. The first pad may be an on-chip pad. The analog plane of the PCB may include a third pad. The third pad may be a PCB pad. The first pad and the third pad may be connected through a wire. The wire may be formed of a conductive material. The third pad may be connected with the first pin of the interface module IM. For example, the first pad, the corresponding wire, and the third pad may be referred to as a "first pad bonding".

For example, the electronic device ED may include a second pad being an on-chip pad. The digital plane of the PCB may include a fourth pad being a PCB pad. The second pad and the fourth pad may be connected through a wire. The fourth pad may be connected with the second pin of the interface module IM. For example, the second pad, the corresponding wire, and the fourth pad may be referred to as a "second pad bonding".

However, the present disclosure are not limited thereto. Unlike the example illustrated in FIG. 18, the electronic system ES may include semiconductor chips connected by using through silicon vias (TSVs). For example, the pad bonding may indicate a through silicon via connecting semiconductor chips.

Any of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

According to the present disclosure, a bandgap reference circuit in which the reliability of a reference voltage is improved by using heterogeneous powers and an electronic device including the same are provided.

Also, a bandgap reference circuit in which the influences due to a noise introduced from any other circuit is reduced and that is more insensitive to the PVT and an electronic device including the same are provided.

While the present disclosure have been described with reference to example embodiments thereof, it will be apparent to those of ordinary skill in the art that various changes and modifications may be made thereto without departing from the spirit and scope of the present disclosure as set forth in the following claims.

What is claimed is:

1. An image sensor comprising:

a pixel array configured to generate an image signal;

a bandgap reference circuit configured to receive an analog ground and a digital ground the analog ground received through a first path separate from the digital ground, and the digital ground received through a second path separate from the analog ground, generate a reference voltage based on the analog ground and the digital ground, and generate a reference current based on the reference voltage;

a ramp generator configured to generate a ramp voltage based on the reference current;

a comparator configured to generate a comparison signal based on a comparison operation of the image signal and the ramp voltage;

a counter configured to determine a count value based on the comparison signal; and a driver and decoder configured to control the pixel array based on the reference voltage.

2. The image sensor of claim 1, further comprising a device interface circuit configured to receive the analog ground and the digital ground and transmit the analog ground and the digital ground to the bandgap reference circuit.

3. The image sensor of claim 2, wherein the device interface circuit is further configured to receive the analog ground via a first pad and receive the digital ground via a second pad different from the first pad.

4. The image sensor of claim 1, wherein the bandgap reference circuit comprises a first collector node configured to receive the digital ground and a first base node configured to receive the analog ground.

5. The image sensor of claim 4, wherein the bandgap reference circuit further comprises a second collector node configured to receive the digital ground and a second base node configured to receive the analog ground.

6. The image sensor of claim 5, wherein the bandgap reference circuit further comprises a third collector node configured to receive the digital ground and a third base node configured to receive the analog ground.

7. The image sensor of claim 1, wherein the bandgap reference circuit is further configured to receive a power supply voltage and generate the reference voltage based on the analog ground, the digital ground, and the power supply voltage.

8. The image sensor of claim 7, wherein the bandgap reference circuit is further configured to receive the power supply voltage via a third path different from the first and second paths.

9. An image sensor comprising:

a pixel array configured to generate image signals;

a bandgap reference circuit configured to generate a reference voltage based on an analog ground and a digital ground, and the bandgap reference circuit comprising:

a first collector node configured to receive the digital ground, a first base node configured to receive the analog ground, the analog ground received through a first path separate from the digital ground, and the digital ground received through a second path separate from the analog ground, a second collector node configured to receive the digital ground, and a second base node configured to receive the analog ground; and a driver and decoder configured to control the pixel array based on the reference voltage received from the bandgap reference circuit.

10. The image sensor of claim 9, wherein the bandgap reference circuit is further configured to receive a power supply voltage via a third path different from the first and second paths.

11. The image sensor of claim 10, wherein the bandgap reference circuit is further configured to generate the reference voltage based on the power supply voltage, the analog ground, and the digital ground.

12. The image sensor of claim 9, wherein the bandgap reference circuit further comprises a current source configured to generate a reference current based on the reference voltage.

* * * * *